United States Patent
Wang et al.

(10) Patent No.: US 11,482,095 B2
(45) Date of Patent: Oct. 25, 2022

(54) WIRELESS CONTROL METHOD, SYSTEM, AND APPARATUS FOR DETERMINING THE STATE OF A POWER SWITCH

(71) Applicant: Huawei Technologies Co., Ltd., Shenzhen (CN)

(72) Inventors: Yafei Wang, Shenzhen (CN); Weiping Zhu, Shenzhen (CN); Jianfeng Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/044,011

(22) PCT Filed: Mar. 29, 2019

(86) PCT No.: PCT/CN2019/080292
§ 371 (c)(1),
(2) Date: Sep. 30, 2020

(87) PCT Pub. No.: WO2019/185004
PCT Pub. Date: Oct. 3, 2019

(65) Prior Publication Data
US 2021/0049898 A1  Feb. 18, 2021

(30) Foreign Application Priority Data
Mar. 31, 2018 (CN) .......................... 201810278515.6

(51) Int. Cl.
*G08C 17/02* (2006.01)
*H05B 47/19* (2020.01)

(52) U.S. Cl.
CPC .............. *G08C 17/02* (2013.01); *H05B 47/19* (2020.01)

(58) Field of Classification Search
CPC ......... G08C 17/02; H04L 12/10; H04L 12/28; H05B 47/19
See application file for complete search history.

(56) References Cited

U.S. PATENT DOCUMENTS

| 2011/0059793 | A1* | 3/2011 | Kondo | .................... | A63F 13/98 463/30 |
| 2014/0306832 | A1* | 10/2014 | Goose | .................... | G08C 17/02 340/870.09 |
| 2016/0209899 | A1* | 7/2016 | Brantner | ............... | H04L 67/125 |
| 2017/0019266 | A1* | 1/2017 | Lim | .................... | H04L 12/6418 |

(Continued)

FOREIGN PATENT DOCUMENTS

| CN | 101540095 A | 9/2009 |
| CN | 103401102 A | 11/2013 |
| CN | 104486090 A | 4/2015 |

(Continued)

*Primary Examiner* — Omer S Khan
(74) *Attorney, Agent, or Firm* — Conley Rose, P.C.

(57) ABSTRACT

A wireless control method includes sending, by a controller, a first control command to instruct the first device to execute a corresponding event, receiving, by a wireless router, the first control command, determining, in response to the first control command, that the first device is not connected to a power supply, and sending a power supply connect instruction to an input apparatus, where the power supply connect instruction instructs the input apparatus to connect the first device to the power supply.

14 Claims, 15 Drawing Sheets

(56) References Cited

U.S. PATENT DOCUMENTS

2017/0271918 A1\* 9/2017 Salerno ................ H01R 24/76
2018/0375919 A1\* 12/2018 Cho ..................... H04L 67/025

FOREIGN PATENT DOCUMENTS

| CN | 104852227 A | 8/2015 |
| CN | 105593959 A | 5/2016 |
| CN | 106774210 A | 5/2017 |
| CN | 108039991 A | 5/2018 |
| WO | 2014031798 A2 | 2/2014 |

\* cited by examiner

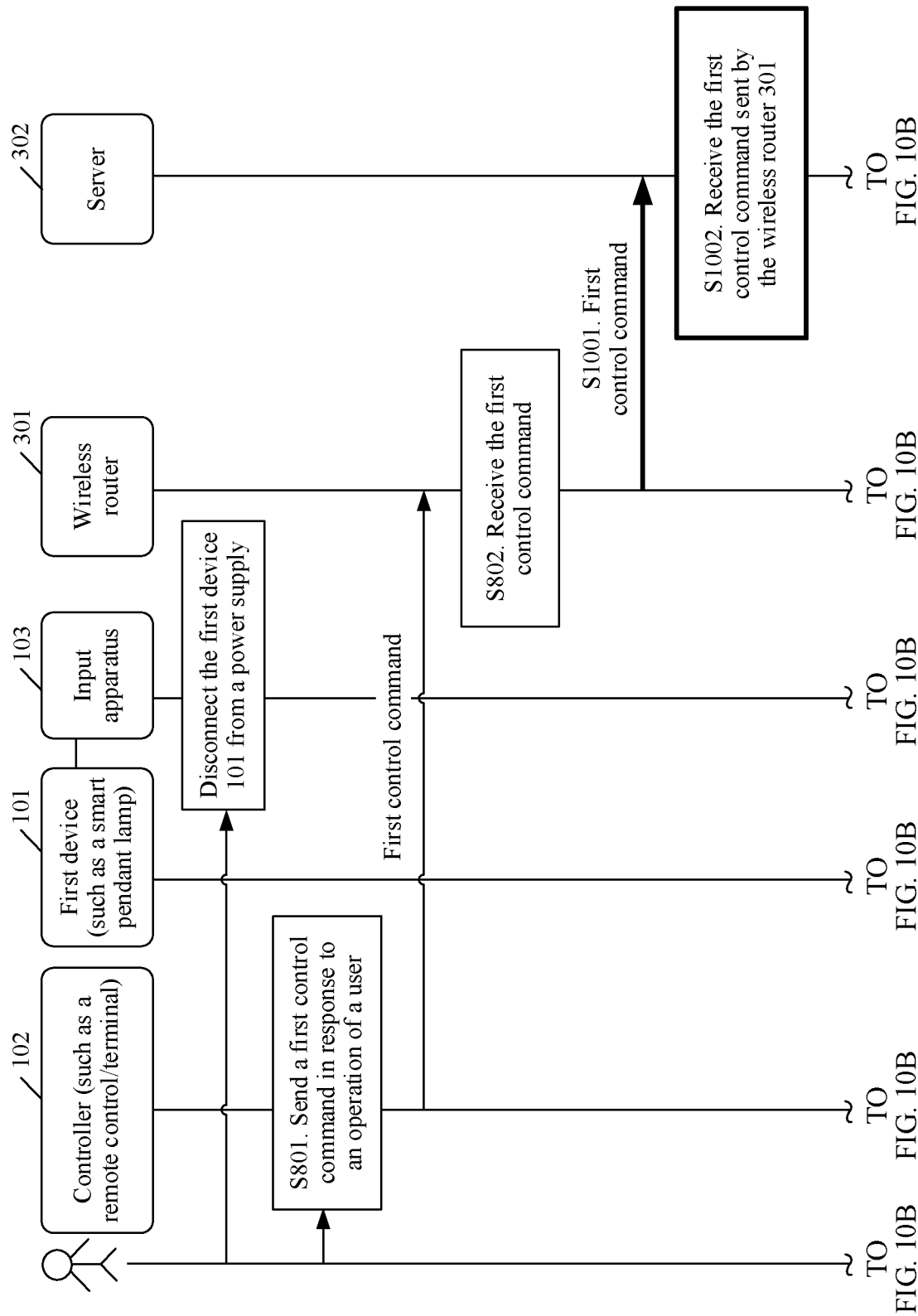

WIRELESS CONTROL METHOD, SYSTEM, AND APPARATUS FOR DETERMINING THE STATE OF A POWER SWITCH

CROSS-REFERENCE TO RELATED APPLICATIONS

This application is a U.S. National Stage of International Patent Application No. PCT/CN2019/080292 filed on Mar. 29, 2019, which claims priority to Chinese Patent Application No. 201810278515.6 filed on Mar. 31, 2018. Both of the aforementioned applications are hereby incorporated by reference in their entireties.

TECHNICAL FIELD

Embodiments of this application relate to the field of communications technologies, and in particular, to a wireless control method and system and an apparatus.

BACKGROUND

With the development of electronic information technologies, a smart household gradually enters people's daily life. The smart household may use a house as a platform, and integrate, by using a wireless local area network such as a wireless fidelity (Wireless Fidelity, WiFi) network, household devices related to household life for control, to improve household security, convenience, and comfortability.

There may be the following three control manners of the smart household: (1) A household device is controlled by using a physical button on the household device (or by using a physical switch that is connected to the household device by using a circuit). (2) A household device is controlled by using a remote control (such as an infrared remote control, a Bluetooth remote control, or a Wi-Fi controller) of the household device. (3) A household device that accesses a wireless network (for example, a Wi-Fi network) is remotely controlled by using another terminal (for example, a mobile phone).

However, a prerequisite for implementing the foregoing control manners (2) and (3) is that the household device is powered on, in other words, a power switch button in the foregoing control manner (1) is on. Once a user turns off a power supply of the household device by using the power switch button in the control manner (1), the household device cannot receive and respond to a wireless control signal sent by the remote control or the another terminal.

SUMMARY

Embodiments of this application provide a wireless control method and system, and an apparatus, so that when a household device is not connected to a power supply, the household device can be controlled by a controller.

According to a first aspect, an embodiment of this application provides a wireless control method. The wireless control method includes: sending, by a controller, a first control command used to instruct a first device to execute a corresponding event; and receiving, by a wireless router, the first control command, determining, in response to the first control command, that the first device is not connected to a power supply, and sending a power supply connect instruction to an input apparatus, where the power supply connect instruction is used to instruct the input apparatus to connect the first device to the power supply.

According to the wireless control method provided in this embodiment of this application, a user disconnects the first device from the power supply by using the input apparatus (in other words, the first device is not connected to the power supply), and a wireless communications module of the first device cannot receive the first control command. However, the wireless router may receive the first control command, and a communications module of the input apparatus may still receive a message or a command. Therefore, after receiving the first control command and determining that the first device is not connected to the power supply, the wireless router may send the power supply instruction to the input apparatus of the first device, to instruct the input apparatus to connect the first device to the power supply. In this way, after the first device is connected to the power supply, the first device may receive the first control command, so that the controller may control the first device in response to an operation of the user. In other words, according to this solution, when a power switch of the first device is turned off, the first device may be controlled by the controller.

In a possible design manner of the first aspect, the sending, by the controller, a first control command includes: sending, by the controller, a first Wi-Fi frame that carries the first control command. The wireless router may listen to and receive the first Wi-Fi frame.

In a possible design of the first aspect, the wireless router and the first device may establish a Bluetooth connection to the controller. The controller may send a Bluetooth signal that carries the first control command. The wireless router may receive the Bluetooth signal.

In a possible design manner of the first aspect, the determining that the first device is not connected to a power supply includes: when a network connection status of the first device is an unconnected mode, determining, by the wireless router, that the first device is not connected to the power supply. The wireless router may store network connection statuses of a plurality of devices, and the network connection status is a connected mode or an unconnected mode.

In a possible design manner of the first aspect, the wireless router may further determine, by using the input apparatus, that the first device is not connected to the power supply. Specifically, the wireless router may receive power supply status information of the first device that is reported by the input apparatus, and the power supply status information is used to indicate that the first device is connected to the power supply or not connected to the power supply. For example, power supply status information "1" is used to indicate that the first device is connected to the power supply, and power supply status information "0" is used to indicate that the first device is not connected to the power supply.

According to a second aspect, an embodiment of this application provides a wireless control method. The wireless control method includes: sending, by a controller, a first control command used to instruct a first device to execute a corresponding event; receiving, by a second device, the first control command, and forwarding the first control command to a server; and receiving, by the server, the first control command, determining that the first device is not connected to a power supply, and sending a power supply connect instruction to an input apparatus, where the power supply connect instruction is used to instruct the input apparatus to connect the first device to the power supply.

According to the wireless control method provided in this embodiment of this application, after receiving the first control command, the second device only needs to forward the first control command to the server. A wireless router does not need to determine whether the first device is connected to the power supply. Instead, the server determines that the first device is not connected to the power supply, and sends the power supply connect instruction to the input apparatus. Because accessing a wireless router and forwarding data are originally within a service scope of the wireless router. Therefore, forwarding the data by the wireless router does not additionally increase load of the wireless router, and therefore does not affect a service on the wireless router or affect transmission of another service. In conclusion, according to the method in this embodiment of this application, when the load of the wireless router is not increased, the first device may be controlled by the controller when the first device is not connected to the power supply.

According to a third aspect, an embodiment of this application provides a wireless control method. The wireless control method includes: sending, by a controller, a first control command used to instruct a first device to execute a corresponding event; receiving, by a wireless router, the first control command, and forwarding the first control command to a server; and receiving, by the server, the first control command, determining that the first device is not connected to a power supply, and sending a power supply connect instruction to an input apparatus, where the power supply connect instruction is used to instruct the input apparatus to connect the first device to the power supply.

According to the wireless control method provided in this embodiment of this application, after receiving the first control command, the wireless router only needs to forward the first control command to the server, and the server determines that the first device is not connected to the power supply, and sends the power supply connect instruction to the input apparatus. The wireless router does not need to determine whether the first device is connected to the power supply. Because accessing a wireless router and forwarding data are originally within a service scope of the wireless router. Therefore, forwarding the data by the wireless router does not additionally increase load of the wireless router, and therefore does not affect a service on the wireless router or affect transmission of another service. In conclusion, according to the method in this embodiment of this application, when the load of the wireless router is not increased, the first device may be controlled by the controller when the first device is not connected to the power supply.

It should be noted that for the first control command and the method for determining that the first device is not connected to the power supply in the second aspect, the third aspect, and the fifth aspect of this application, refer to related descriptions in the first aspect and the possible design manners of the first aspect. Details are not described herein again in this embodiment of this application.

According to a fourth aspect, an embodiment of this application provides a wireless control method. The wireless control method includes: sending, by a controller, a first control command used to instruct a first device to execute a corresponding event; and receiving, by an input apparatus, the first control command, and connecting the first device to a power supply.

According to the wireless control method provided in this embodiment of this application, a user disconnects the first device from the power supply by using the input apparatus, and a wireless communications module of the first device cannot listen to and receive the first control command. However, a communications module of the input apparatus may still receive the first control command, and may connect the first device to the power supply in response to the first control command. In this way, after the first device is connected to the power supply and is powered on and started, the controller may control the first device in response to an operation of the user. In other words, according to this solution, when the first device is not connected to the power supply, the first device may be controlled by the controller 102.

According to a fifth aspect, an embodiment of this application provides a wireless control method. The wireless control method includes: sending, by a controller, a first control command used to instruct a first device to execute a corresponding event; and when the first device is not connected to a power supply, sending, by a third device, a power supply connect instruction to an input apparatus, where the power supply connect instruction is used to instruct the input apparatus to connect the first device to the power supply.

According to the wireless control method provided in this embodiment of this application, a user disconnects the first device from the power supply by using the input apparatus, and a wireless communications module of the first device cannot listen to and receive the first control command. However, the third device may still receive the first control command, and a communications module of the input apparatus may still receive a message or a command. Therefore, after receiving the first control command and determining that the first device is not connected to the power supply, the third device may send the power supply instruction to the input apparatus, to instruct the input apparatus to connect the first device to the power supply. In this way, after the first device is connected to the power supply, the first device may receive the first control command, so that the controller may control the first device in response to an operation of the user. In other words, according to this solution, when a power switch of the first device is turned off, the first device may be controlled by the controller.

In a possible design manner of the fifth aspect, the third device is a wireless router. When the first device is not connected to the power supply, the sending, by a third device, a power supply connect instruction to an input apparatus includes: receiving, by the wireless router, the first control command; when a network connection status of the first device is an unconnected mode, determining, by the wireless router, that the first device is not connected to the power supply; or determining, by the wireless router by using the input apparatus, that the first device is not connected to the power supply; and sending, by the wireless router, the power supply connect instruction to the input apparatus.

The user disconnects the first device from the power supply by using the input apparatus (in other words, the first device is not connected to the power supply), and the wireless communications module of the first device cannot receive the first control command. However, the wireless router may receive the first control command, and the input apparatus may still receive a message or a command. Therefore, after receiving the first control command and determining that the first device is not connected to the power supply, the wireless router may send the power supply instruction to the input apparatus of the first device, to instruct the input apparatus to connect the first device to the power supply. In this way, after the first device is connected to the power supply, the first device may receive the first control command, so that the controller may control the first device in response to an operation of the user. In other words, according to this solution, when a power switch of the first device is turned off, the first device may be controlled by the controller.

In a possible design of the fifth aspect, the third device is a server. When the first device is not connected to the power supply, before the sending, by a third device, a power supply connect instruction to an input apparatus, the method in this embodiment of this application further includes: receiving, by a second device or a wireless router, the first control command, and forwarding the first control command to the server. When the first device is not connected to the power supply, the sending, by a third device, a power supply connect instruction to an input apparatus includes: receiving, by the server, the first control command; when a network connection status of the first device is an unconnected mode, determining, by the server, that the first device is not connected to the power supply; or determining, by the server by using the input apparatus, that the first device is not connected to the power supply; and sending, by the server, the power supply connect instruction to the input apparatus.

According to the wireless control method provided in this embodiment of this application, when the first device controlled by the controller is disconnected from the power supply, the second device or the wireless router receives the first control command, and the server determines whether the first device is connected to the power supply. This does not additionally increase load of the wireless router. In other words, according to the method in this embodiment of this application, when the load of the wireless router is not increased, the first device may be controlled by the controller when the first device is not connected to the power supply.

According to a sixth aspect, an embodiment of this application provides a wireless control system. The wireless control system includes a controller, a first device, an input apparatus, and a wireless router. The input apparatus is configured to: in response to an operation of a user, connect the first device to or disconnect the first device from a power supply. The controller is configured to send a first control command, where the first control command is used to instruct the first device to execute a corresponding event. The wireless router is configured to: receive the first control command, determine, in response to the first control command, that the first device is not connected to the power supply, and send a power supply connect instruction to the input apparatus. The input apparatus is further configured to: receive the power supply connect instruction, and connect the first device to the power supply.

In a possible design manner of the sixth aspect, the first control command is a first Wi-Fi frame, and the wireless router is configured to listen to and receive the first Wi-Fi frame.

In another possible design manner of the sixth aspect, that the wireless router is configured to determine that the first device is not connected to the power supply includes: the wireless router is configured to: when a network connection status of the first device is an unconnected mode, determine that the first device is not connected to the power supply; or determine, by using the input apparatus, that the first device is not connected to the power supply.

According to a seventh aspect, an embodiment of this application provides a wireless control system, and the wireless control system includes a controller, a first device, an input apparatus, a second device, and a server. The input apparatus is configured to: in response to an operation of a user, connect the first device to or disconnect the first device from a power supply. The controller is configured to send a first control command, where the first control command is used to instruct the first device to execute a corresponding event. The second device is configured to: receive the first control command, and forward the first control command to the server. The server is configured to: receive the first control command sent by the second device, determine that the first device is not connected to the power supply, and send a power supply connect instruction to the input apparatus. The input apparatus is further configured to: receive the power supply connect instruction, and connect the first device to the power supply.

In a possible design manner of the seventh aspect, the first control command is a first wireless fidelity Wi-Fi frame, and the second device is configured to listen to and receive the first Wi-Fi frame.

In another possible design manner of the seventh aspect, that the server is configured to determine that the first device is not connected to the power supply includes: the server is configured to: when a network connection status of the first device is an unconnected mode, determine that the first device is not connected to the power supply; or determine, by using the input apparatus, that the first device is not connected to the power supply.

According to an eighth aspect, an embodiment of this application provides a wireless control system, and the wireless control system includes a controller, a first device, an input apparatus, a wireless router, and a server. The input apparatus is configured to: in response to an operation of a user, connect the first device to or disconnect the first device from a power supply. The controller is configured to send a first control command, where the first control command is used to instruct the first device to execute a corresponding event. The wireless router is configured to: receive the first control command, and forward the first control command to the server. The server is configured to: receive the first control command sent by the wireless router, determine that the first device is not connected to the power supply, and send a power supply connect instruction to the input apparatus. The input apparatus is further configured to: receive the power supply connect instruction, and connect the first device to the power supply.

According to a ninth aspect, an embodiment of this application provides a wireless control system, and the wireless control system includes a controller, a first device, and an input apparatus. The input apparatus is configured to: in response to an operation of a user, connect the first device to or disconnect the first device from a power supply. The controller is configured to send a first control command, where the first control command is used to instruct the first device to execute a corresponding event. The input apparatus is further configured to: receive the first control command, and connect the first device to the power supply.

According to a tenth aspect, an embodiment of this application provides a wireless control method, the wireless control method is applied to an input apparatus of a first device, and the input apparatus is configured to: in response to an operation of a user, connect the first device to or disconnect the first device from a power supply. The method includes: receiving, by the input apparatus, a power supply connect instruction sent by a wireless router or a server, where the power supply connect instruction is sent when the first device is not connected to the power supply; and connecting, by the input apparatus, the first device to the power supply in response to the power supply connect instruction.

According to an eleventh aspect, an embodiment of this application provides a wireless control method, the wireless control method is applied to an input apparatus of a first device, and the input apparatus is configured to: in response to an operation of a user, connect the first device to or disconnect the first device from a power supply. The method includes: receiving, by the input apparatus, a first control command, where the first control command is sent by a controller, and the first control command is used to instruct the first device to execute a corresponding event; and connecting, by the input apparatus, the first device to the power supply in response to the first control command.

According to a twelfth aspect, an embodiment of this application provides an input apparatus, and the input apparatus includes a processor, a memory, and a communications interface. The communications interface and the memory are coupled to the processor, the communications interface is configured to receive and send data, the memory includes a nonvolatile storage medium, the memory is configured to store computer program code, and the computer program code includes a computer instruction. When the processor executes the computer instruction, the communications interface is configured to receive a power supply instruction or a first control command, and the processor is configured to connect the first device to a power supply in response to the power supply instruction or the first control command received by the communications interface.

According to a thirteenth aspect, an embodiment of this application provides a wireless router, and the wireless router includes a processor, a memory, and a communications interface. The communications interface and the memory are coupled to the processor, the communications interface is configured to receive and send data, the memory includes a nonvolatile storage medium, the memory is configured to store computer program code, and the computer program code includes a computer instruction. When the processor executes the computer instruction, the communications interface is configured to receive the first control command, and the processor is configured to: determine that a first device is not connected to a power supply, and send a power supply connect instruction to an input apparatus by using the communications interface, where the power supply connect instruction is used to instruct the input apparatus to connect the first device to the power supply.

According to a fourteenth aspect, an embodiment of this application provides a server, and the server includes a processor, a memory, and a communications interface. The communications interface and the memory are coupled to the processor, the communications interface is configured to receive and send data, the memory includes a nonvolatile storage medium, the memory is configured to store computer program code, and the computer program code includes a computer instruction. When the processor executes the computer instruction, the communications interface is configured to receive the first control command, and the processor is configured to: determine that a first device is not connected to a power supply, and send a power supply connect instruction to an input apparatus by using the communications interface, where the power supply connect instruction is used to instruct the input apparatus to connect the first device to the power supply.

According to a fifteenth aspect, an embodiment of this application provides a computer storage medium, and the computer storage medium includes a computer instruction. When the computer instruction is run on an input apparatus, the input apparatus is enabled to perform corresponding method steps in the methods according to the first aspect to the fifth aspect, the tenth aspect, the eleventh aspect, and different design manners thereof.

According to a sixteenth aspect, an embodiment of this application provides a computer storage medium, and the computer storage medium includes a computer instruction. When the computer instruction is run on a wireless router, the wireless router is enabled to perform corresponding method steps in the method according to the first aspect, the third aspect, and different design manners thereof.

According to a seventeenth aspect, an embodiment of this application provides a computer storage medium, and the computer storage medium includes a computer instruction. When the computer instruction is run on a server, the server is enabled to perform corresponding method steps in the method according to the second aspect, the third aspect, and different design manners, or possible design manners thereof.

According to an eighteenth aspect, an embodiment of this application provides a computer program product. When the computer program product is run on an input apparatus, the input apparatus is enabled to perform corresponding method steps in the methods according to the first aspect to the fifth aspect, the tenth aspect, the eleventh aspect, and different design manners thereof.

According to a nineteenth aspect, an embodiment of this application provides a computer program product. When the computer program product is run on a wireless router, the wireless router is enabled to perform corresponding method steps in the method according to the first aspect, the third aspect, and different design manners thereof.

According to a twentieth aspect, an embodiment of this application provides a computer program product. When the computer program product is run on a wireless router, the wireless router is enabled to perform corresponding method steps in the method according to the second aspect, the third aspect, and different design manners of the second aspect and the third aspect, or possible design manners thereof.

In addition, for technical effects brought by any one of the design manners in the fifth aspect to the twentieth aspect, refer to technical effects brought by different design methods in the first aspect to the fifth aspect and different design manners thereof. Details are not described herein again.

BRIEF DESCRIPTION OF DRAWINGS

FIG. 10A and FIG. 10B are a flowchart 2 of a wireless control method according to an embodiment of this application;

DESCRIPTION OF EMBODIMENTS

Figure 1:
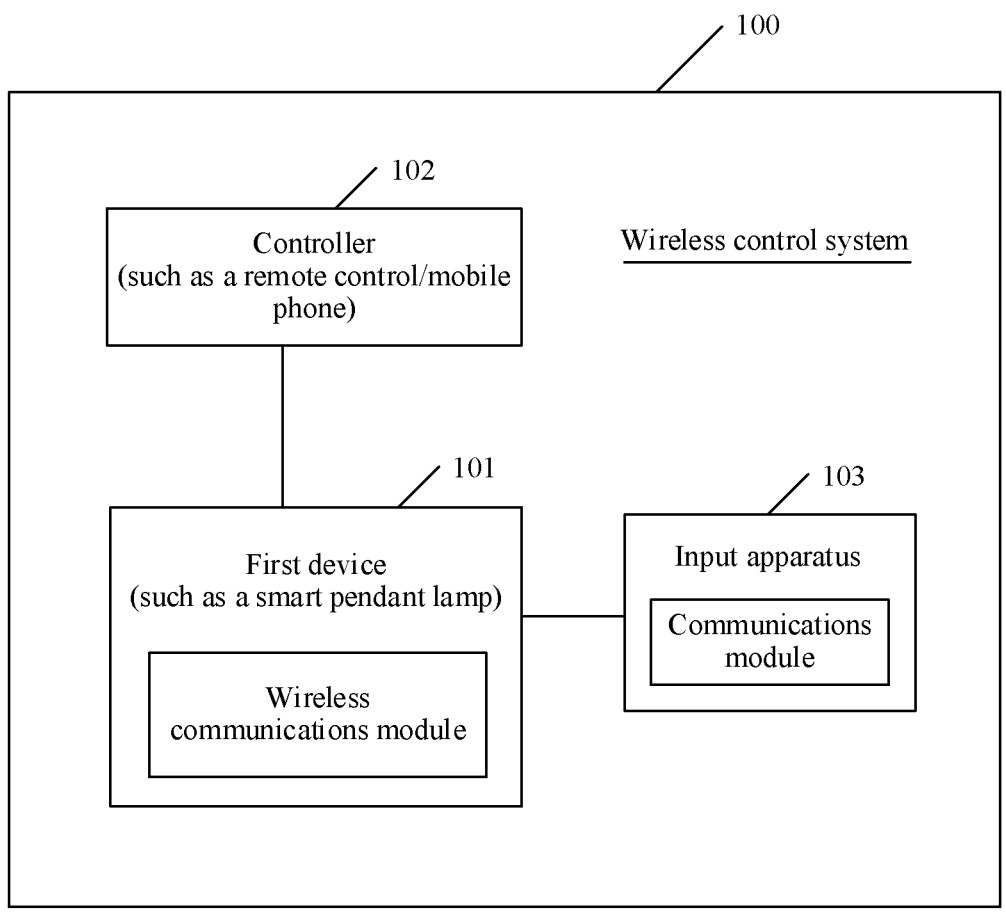
FIG. 1 is a schematic diagram 1 of a system architecture of a wireless control system according to an embodiment of this application.

The embodiments of this application provide a wireless control method that may be applied to a process in which a controller (for example, a remote control or an intelligent terminal) of a device performs wireless control on the device when an input apparatus of the device is turned off (in other words, the input apparatus disconnects the device from a power supply). For example, the wireless control method may be applied to a smart household scenario. Specifically, a household device may be controlled by both a controller and an input apparatus. The wireless control method provided in the embodiments of this application may be applied to a process in which the controller of the household device controls the household device when the input apparatus disconnects the home device from a power supply.

For example, the household device in this application may be a smart television, a smart refrigerator, a smart washing machine, a smart rice cooker, and a smart pendant lamp.

In the embodiments of this application, the input apparatus of the device connects the device and the power supply of the device, and is configured to control connection or disconnection of a power supply path between the device and the power supply. In addition, the input apparatus may be further configured to adjust a parameter of the device, for example, adjust brightness of a smart pendant lamp and adjust volume of a smart television.

In the embodiments of this application, that "the input apparatus implements "connection" and "disconnection" control on the power supply path between the device and the power supply" and that "the input apparatus controls connection or disconnection of the power supply path between the device and the power supply" both may be used to express the meaning that "the input apparatus connects the device to or disconnects the device from the power supply".

The input apparatus of the device may be a physical power button or a touchscreen power button disposed on a control panel of the device. Alternatively, the input apparatus of the device may be a physical switch or a touchscreen switch that is connected to the device by using a physical circuit. For example, when the device is a television, the input apparatus may be a power button on the television. When the device is a smart pendant lamp, the input apparatus may be a physical switch or a touchscreen switch that is connected to the smart pendant lamp by using a physical circuit.

"The input apparatus of the device is turned off" described in the embodiments of this application means that a power supply interface of the device is connected to a power supply (for example, a power plug of the device is inserted into a power strip, and a switch of the power strip that supplies power for the device is turned on), but the input apparatus of the device is set to an off state. That the input apparatus of the device is set to the off state means that although the input apparatus is connected to the power supply, the input apparatus disconnects the power supply path between the device and the power supply.

It may be understood that when the input apparatus of the device is connected to the physical switch or the touchscreen switch of the device by using the physical circuit, the input apparatus may be an input apparatus of one or more devices. When the input apparatus is an input apparatus of a plurality of devices, the input apparatus may separately control connection or disconnection of power supply paths between the plurality of devices and the power supply.

FIG. 1 is a schematic structural diagram of a wireless control system according to an embodiment of this application. As shown in FIG. 1, the wireless control system 100 may include a first device 101, a controller 102, and an input apparatus 103 of the first device 101.

The first device 101 may be the foregoing household device. For example, the first device 101 may be a smart pendant lamp 201.

The controller 102 is configured to send a control command to the first device 101, to control turn-on and turn-off of the first device 101, and adjust a parameter of the first device 101 (for example, adjust brightness of the smart pendant lamp). The controller 102 may be a remote control or an intelligent terminal of the first device 101. For example, the intelligent terminal may be a terminal such as a mobile phone, a tablet computer, a wearable device, an augmented reality (augmented reality, AR)\virtual reality (virtual reality, VR) device, a notebook computer, an ultra-mobile personal computer (ultra-mobile personal computer, UMPC), a netbook, or a personal digital assistant (personal digital assistant, PDA). This is not limited in the embodiments of this application.

For a specific function of the input apparatus 103, refer to the detailed descriptions in the foregoing embodiment. Details are not described herein again in the embodiments of this application. In addition, FIG. 1 shows a connection relationship between the first device 101 and the input apparatus 103 by using an example in which the input apparatus 103 is connected to the first device 101 by using a physical circuit. In the embodiments of this application, the input apparatus 103 may control, by using a relay, connection or disconnection of a power supply path between the first device 101 and a power supply.

Generally, an input apparatus of a device implements connection or disconnection control on a power supply path between the device and a power supply by operating a button (for example, a physical power button or a touchscreen power button) or a switch (for example, a physical switch or a touchscreen switch) of the input apparatus by a user. A wireless communications module (for example, a Wi-Fi module) of the first device 101 is included in the first device 101. Therefore, after the user disconnects the power supply path between the first device 101 and the power supply by using the input apparatus 103, the wireless communications module of the first device 101 is also in a power-off state, and cannot receive a control command sent by the controller 102. Therefore, the user cannot control the first device 101 by using the controller 102.

However, in the embodiments of this application, as shown in FIG. 1, a communications module may be disposed in the input apparatus 103. The communications module is in the input apparatus 103 and is independent of the first device 101. Therefore, even if the user disconnects the power supply path between the first device 101 and the power supply by using the input apparatus 103, the communications module of the input apparatus 103 is not powered off. The communications module may receive a power supply instruction sent by a third device, and connect the first device 101 to the power supply, in other words, connect the power supply path between the first device 101 and the power supply. In this way, in the embodiments of this application, when the user disconnects the power supply path between the first device 101 and the power supply by using the input apparatus 103, if the controller 102 sends a control command used to control the first device 101, even if the first device 101 cannot receive the control command due to power off, the third device may also detect the control command. Then, when detecting the control command, the third device may send a power supply instruction to the communications module of the input apparatus 103, to instruct the input apparatus 103 to connect the power supply path between the first device 101 and the power supply. After the input apparatus 103 connects the power supply path between the first device 101 and the power supply, the user may control the first device 101 by using the controller 102.

The wireless communications module of the first device 101 may be any one of communications modules such as a Wi-Fi module, a Bluetooth (Bluetooth, BL) module, and an infrared communications module. This is not limited in the embodiments of this application. In the embodiments of this application, subsequently, the method in the embodiments of this application is described mainly by using an example in which the wireless communications module of the first device 101 is the Wi-Fi module.

Figure 2:
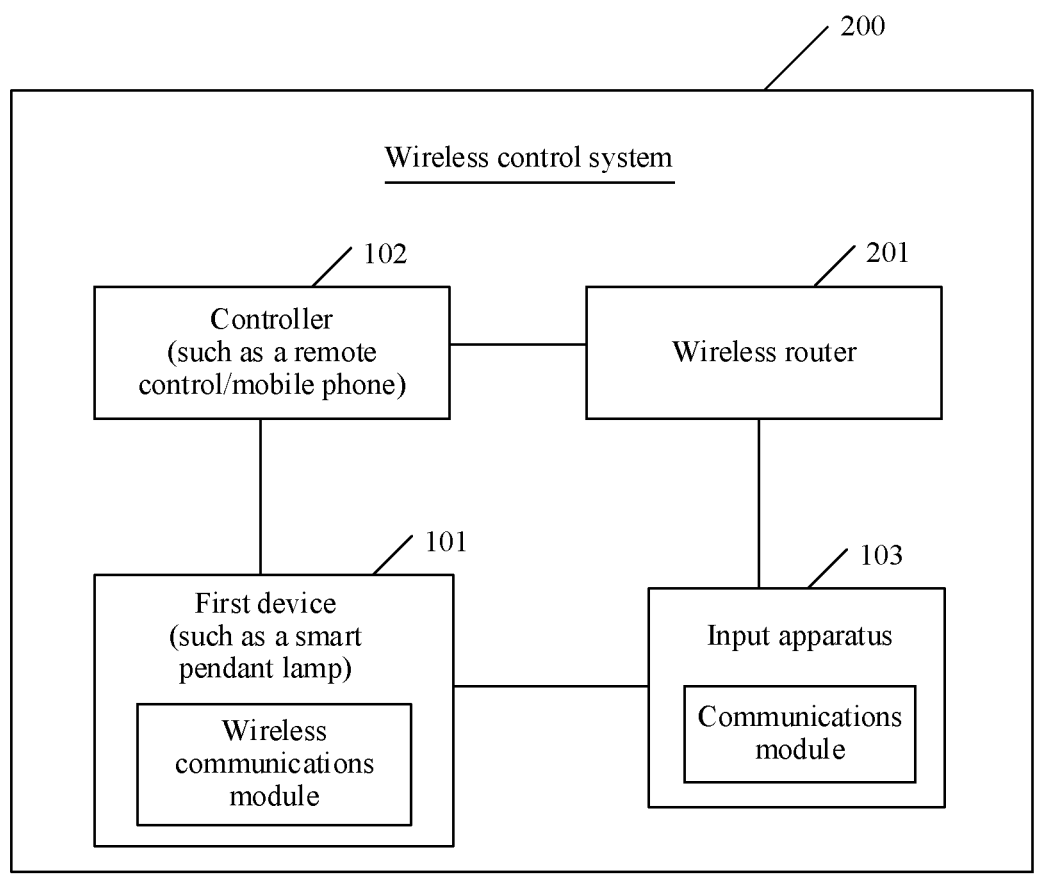
FIG. 2 is a schematic diagram 2 of a system architecture of a wireless control system according to an embodiment of this application.

In a first application scenario of the embodiments of this application, a wireless control system is further provided in the embodiments of this application. As shown in FIG. 2, the wireless control system 200 includes a first device 101, a controller 102, an input apparatus 103 of the first device 101, and a wireless router 201.

For details of the first device 101, the controller 102, and the input apparatus 103, refer to related descriptions in FIG. 1. Details are not described herein again in the embodiments of this application. When a user disconnects a power supply path between the first device 101 and a power supply by using the input apparatus 103, if the controller 102 sends a control command used to control the first device 101, even if the first device 101 cannot receive the control command due to power off, the wireless router may also detect the control command. Then, the wireless router may send a power supply instruction to a communications module of the input apparatus 103, to instruct the input apparatus 103 to connect the power supply path between the first device 101 and the power supply. In other words, the foregoing third device may be the wireless router 201.

Figure 3:
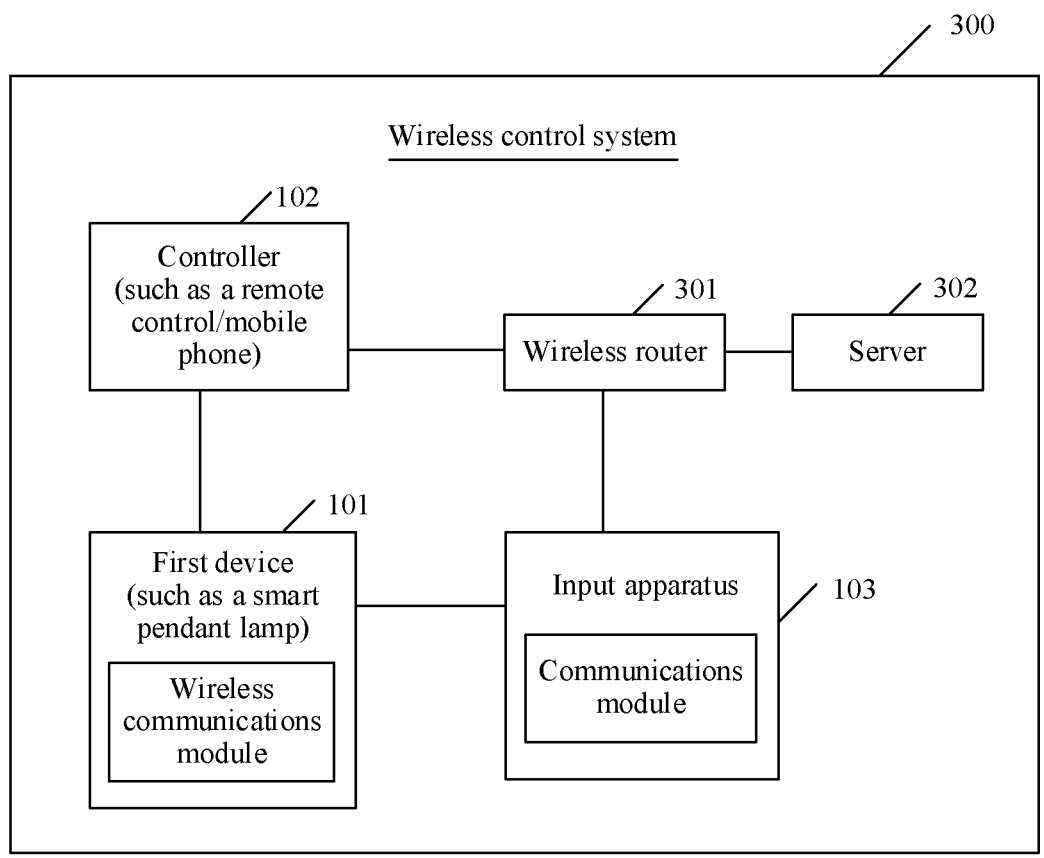
FIG. 3 is a schematic diagram 3 of a system architecture of a wireless control system according to an embodiment of this application.

In a second application scenario of the embodiments of this application, a wireless control system is further provided in the embodiments of this application. As shown in FIG. 3, the wireless control system 300 includes a first device 101, a controller 102, an input apparatus 103 of the first device 101, a wireless router 301, and a server 302. In the second application scenario, even if the first device 101 cannot receive, due to power off, a control command sent by the controller 102, the wireless router 301 may also detect the control command, and then forward the control command to the server 302. After identifying the control information, the server 302 sends a power supply instruction to the input apparatus 103 by using the wireless router 301, to instruct the input apparatus 103 to connect a power supply path between the first device 101 and a power supply.

Figure 4:
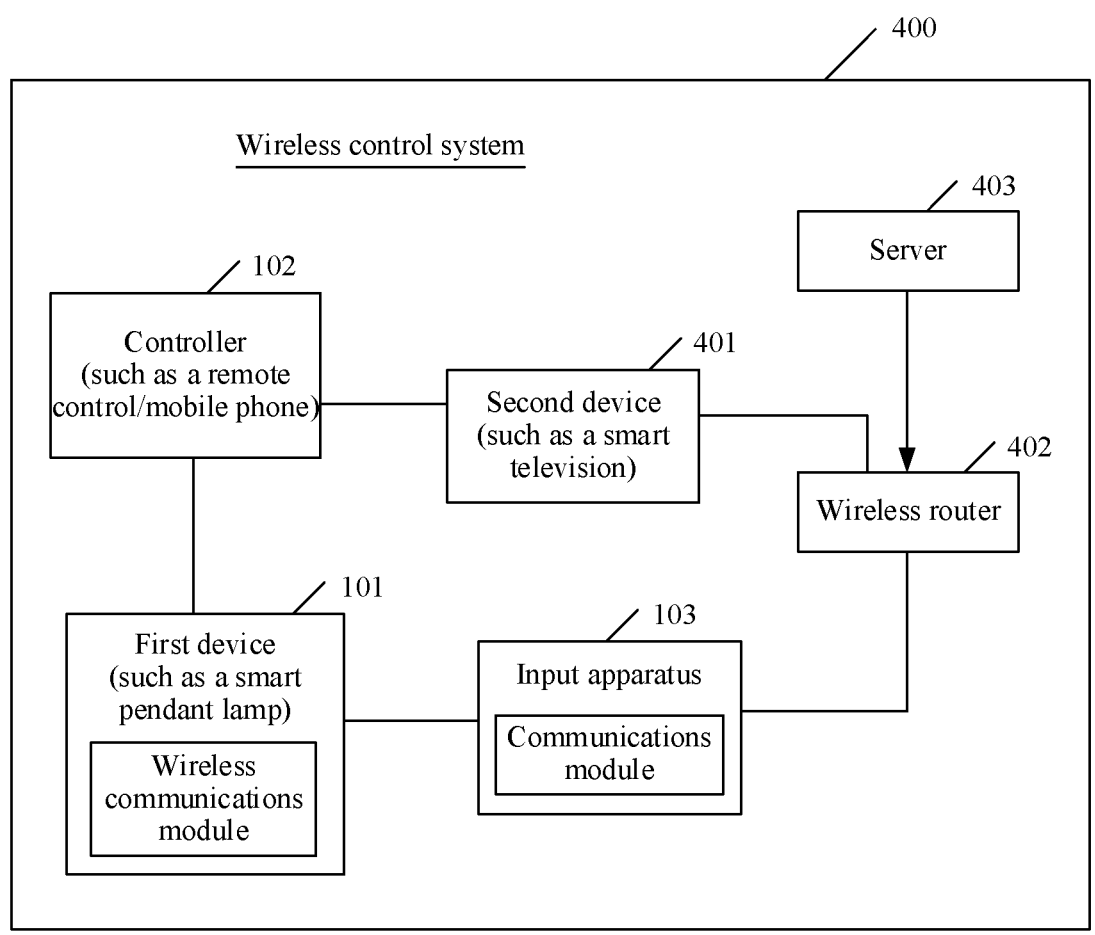
FIG. 4 is a schematic diagram 4 of a system architecture of a wireless control system according to an embodiment of this application.

In a third application scenario of the embodiments of this application, a wireless control system is further provided in the embodiments of this application. As shown in FIG. 4, the wireless control system 400 includes a first device 101, a controller 102, an input apparatus 103 of the first device 101, a second device 401, a wireless router 402, and a server 403. In a smart household scenario, the second device 401 may be another household device different from the first device 101. For example, when the first device 101 is a smart pendant lamp, the second device 401 may be a smart television. In the third application scenario, even if the first device 101 cannot receive, due to power off, a control command sent by the controller 102, the second device 401 may also detect the control command, and then forward the control command to the server 403 by using the wireless router 402. After identifying the control information, the server 403 sends a power supply instruction to the input apparatus 103 by using the wireless router 402, to instruct the input apparatus 103 to connect a power supply path between the first device 101 and a power supply.

The control command sent by the controller 102 to the first device 101 may be a Wi-Fi frame, for example, a probe request (Probe Request) frame. The server (for example, the server 403 and the server 302) in the embodiments of this application may be an IoT server.

The wireless router 402 in the third application scenario is used by the server 403 and another device (for example, the second device 401 and the input apparatus 103) to forward data. For example, the wireless router 402 sends, to the server 403, the control command received from the second device 401, and the wireless router 402 sends, to the input apparatus 103, the power supply instruction received from the server 403.

Figure 5:
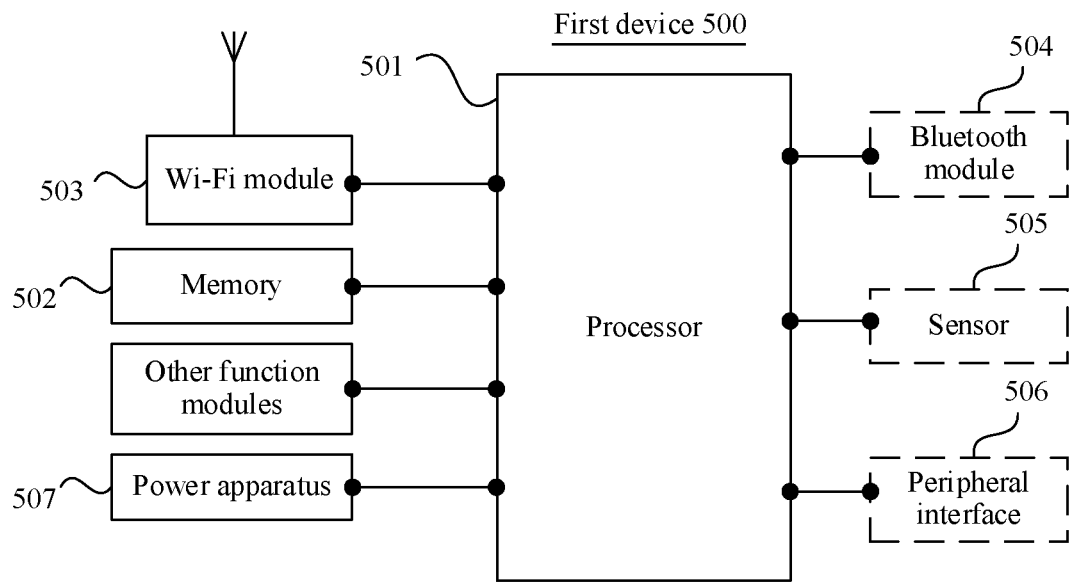
FIG. 5 is a schematic diagram of a hardware structure of a first device according to an embodiment of this application.

FIG. 5 is a schematic diagram of a hardware structure of a first device (for example, the first device 101 shown in any one of FIG. 1 to FIG. 4) according to an embodiment of this application. As shown in FIG. 5, the first device 500 includes components such as a processor 501, a memory 502, a Wi-Fi module 503, and other function modules. These components may communicate by using one or more communications buses or signal cables (not shown in FIG. 5). A person skilled in the art may understand that a hardware structure shown in FIG. 5 does not constitute a limitation on the first device 500, and the first device 500 may include more or fewer components than those shown in the figure, or some components may be combined, or different component configurations may be used.

When the first device 500 is different types of terminals, the foregoing other function modules are different. For example, when the first device 500 is a smart pendant lamp, the foregoing other function modules may include a light emitting device (for example, a light emitting diode or an LED light source), a glass chimney, a metal lamp housing, and the like. When the first device 500 is a smart television, the foregoing other function modules may include a display, an audio circuit, a loudspeaker, a microphone, and the like. When the first device 500 is an intelligent air conditioner, the foregoing other function modules may include apparatuses such as a sensor and a compressor.

The following describes each component of the first device 500 in detail with reference to FIG. 5.

The processor 501 is a control center of the first device 500. The processor 501 is connected to each part of the first device 500 by using various interfaces and cables, runs or executes an application program stored in the memory 502, and invokes data stored in the memory 502, to perform various functions of the first device 500 and process data. In some embodiments, the processor 501 may include one or more processing units.

The memory 502 is configured to store an application program and data. The processor 501 runs the application program and the data that are stored in the memory 502, to execute various functions of the first device 500 and process data. The memory 502 mainly includes a program storage area and a data storage area. The program storage area may store an operating system, and an application program required by at least one function (for example, a sound playing function or an image playing function). The data storage area may store data (for example, audio data or a phonebook) created based on use of the first device 500. In addition, the memory 502 may include a high-speed random access memory (Random Access Memory, RAM), or may include a nonvolatile memory such as a magnetic disk storage device and a flash memory device, or another volatile solid-state storage device. The memory 502 may store various operating systems. The memory 502 may be independent, and is connected to the processor 501 by using the communications bus, or the memory 502 may be integrated with the processor 501.

The Wi-Fi module 503 is configured to provide, for the first device 500, network access that complies with a Wi-Fi related standard or protocol. The first device 500 may access a Wi-Fi hotspot by using the Wi-Fi module 503, to provide a wireless communication service. In the embodiments of this application, after accessing the Wi-Fi hotspot, the Wi-Fi module 503 may receive a control instruction sent by a controller of the first device 500, and transmit the control instruction to the processor 501. The processor 501 executes a corresponding event in response to the control instruction. For example, when the first device 500 is a smart pendant lamp, the Wi-Fi module 503 may receive a Wi-Fi frame that is sent by the controller 102 and that is used to instruct to lower brightness of the smart pendant lamp, and the processor 501 executes the Wi-Fi frame to lower the brightness of the smart pendant lamp. When the first device 500 is a smart television, the Wi-Fi module 503 may receive a Wi-Fi frame that is sent by the controller 102 and that is used to instruct to turn down volume of the smart television, and the processor 501 executes the Wi-Fi frame to turn down the volume of the smart television. In some other embodiments, the Wi-Fi module 503 may alternatively be used as a Wi-Fi wireless access point, to provide Wi-Fi network access for another device.

Further, the first device 500 may further include a Bluetooth module 504, a sensor 505, a peripheral interface 506, a power apparatus 507, and the like. For detailed descriptions of the Bluetooth module 504, the sensor 505, the peripheral interface 506, and the power apparatus 507 in the first device 500, refer to subsequent related descriptions of a Bluetooth module, a sensor, a peripheral interface, and a power supply apparatus in the embodiments of this application. Details are not described herein in the embodiments of this application.

Figure 6:
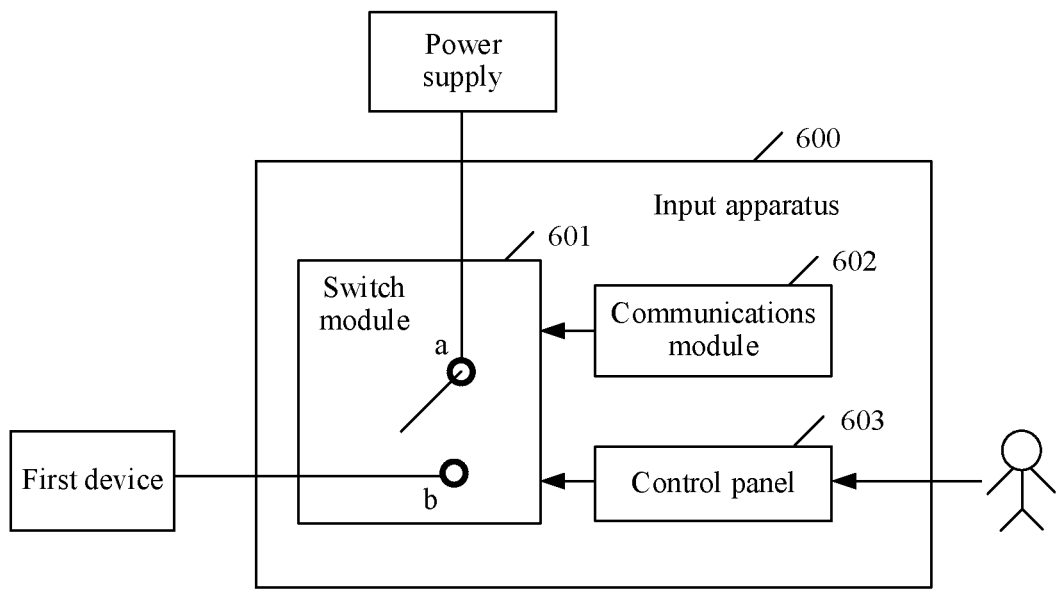
FIG. 6 is a principle schematic diagram of an input apparatus according to an embodiment of this application.

FIG. 6 is a schematic diagram of a hardware structure of an input apparatus (for example, the input apparatus 103 shown in any one of FIG. 1 to FIG. 4) according to an embodiment of this application. As shown in FIG. 6, the input apparatus 600 includes a switch module 601, a communications module 602, and a control panel 603. These components may communicate by using one or more communications buses or signal cables (not shown in FIG. 6). A person skilled in the art may understand that a hardware structure shown in FIG. 6 does not constitute a limitation on the input apparatus 600, and the input apparatus 600 may include more or fewer components than those shown in the figure, or some components may be combined, or different component configurations may be used.

As shown in FIG. 6, the switch module 601 may include a movable end a and a non-movable end b. The movable end a is connected to a power supply, and the non-movable end b is connected to a first device. The switch module 601 may control connection or disconnection of a power supply path between the first device and the power supply by controlling connection and disconnection of the movable end a and the non-movable end b. Specifically, when the movable end a is connected to the non-movable end b, the power supply path between the first device and the power supply is connected. When the movable end a is disconnected from the non-movable end b, the power supply path between the first device and the power supply is disconnected. FIG. 6 shows an operating principle of the switch module 601 by using an example, and constitutes no limitation on actual hardware composition of the switch module 601.

For example, the switch module 601 may be a relay. The relay (relay) is an electrical control device, and works as follows: When a change of an input variable (incentive variable) reaches a specified requirement, the relay exerts a preset step change on a controlled variable in an electric output circuit. The relay performs interaction between a control system (or referred to as an input loop) and a controlled system (or referred to as an output loop). The relay is usually used in automatic control circuits. The relay is actually an "automatic switch" that controls operations of large currents with small currents, and has functions such as automatic adjustment, safety protection, and circuit switching in the circuits. For example, the relay usually has an induction mechanism (an input part) that can reflect a specific input variable (such as a current, a voltage, power, impedance, a frequency, a temperature, pressure, a speed, or light), an execution mechanism (an output part) that can implement "connection" and "disconnection" control on a controlled circuit, and an intermediate mechanism (a driving part) that is between the input part and the output part of the relay and that performs coupling, isolation, and function processing on the input variable, and drives the output part.

The control panel 603 may be a physical power switch or a touchscreen power switch. Generally, a user may control, by operating the control panel 603, the switch module 601 to implement "connection" and "disconnection" control on the power supply path between the first device and the power supply. Compared with a conventional input apparatus, the input apparatus provided in the embodiments of this application further includes a communications module 602. The communications module 602 may receive a control command sent by a third device, and the switch module 601 executes the control command to implement "connection" and "disconnection" control on the power supply path between the first device and the power supply. In other words, the input apparatus 600 in the embodiments of this application may connect or disconnect the power supply path between the first device and the power supply in response to an operation of the user on the control panel 603, or may connect or disconnect the power supply path between the first device and the power supply based on the control command received by the communications module 602.

The communications module 602 may be a wireless communications module or a wired communications module. The wireless communications module may be a Wi-Fi module, a Bluetooth module, or the like, and the wired communications module may be an interface configured to connect to a wired communications network (for example, a fiber optic network).

It should be noted that the controller in the embodiments of this application may be a remote control of a first device or the foregoing third device. When the controller is the remote control of the first device, for a specific hardware structure of the controller, refer to a detailed description of a remote control of an intelligent device in a conventional technology. Details are not described herein in the embodiments of this application.

Figure 7:
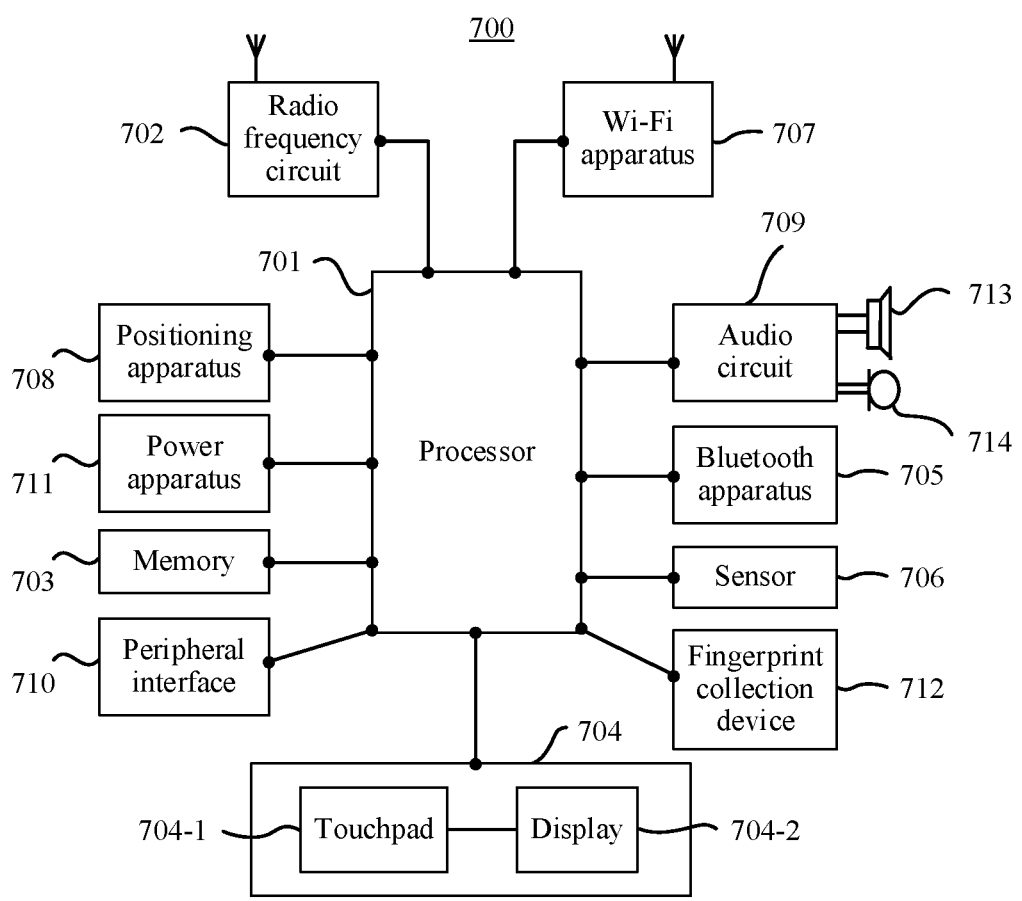
FIG. 7 is a schematic diagram of a hardware structure of a mobile phone according to an embodiment of this application.

As shown in FIG. 7, a mobile phone 700 is used as an example of the controller. The mobile phone 700 may specifically include components such as a processor 701 and a radio frequency (Radio Frequency, RF) circuit 702, a memory 703, a touchscreen 704, a Bluetooth apparatus 705, one or more sensors 706, a Wi-Fi apparatus 707, a positioning apparatus 708, an audio circuit 709, a peripheral interface 710, and a power supply apparatus 711. These components may communicate by using one or more communications buses or signal cables (not shown in FIG. 7). A person skilled in the art may understand that a hardware structure shown in FIG. 7 does not constitute a limitation on the mobile phone, and the mobile phone 700 may include more or fewer components than those shown in the figure, or some components may be combined, or different component configurations may be used.

The following describes each component of the mobile phone 700 in detail with reference to FIG. 7.

The processor 701 is a control center of the mobile phone 700. The processor 701 is connected to each part of the mobile phone 700 by using various interfaces and cables, runs or executes an application program stored in the memory 703, and invokes data stored in the memory 703, to perform various functions of the mobile phone 700 and process data. In some embodiments, the processor 701 may include one or more processing units.

The radio frequency circuit 702 may be configured to: receive and send radio signals. Particularly, after receiving downlink data from a base station, the radio frequency circuit 702 may send the downlink data to the processor 701 for processing, and send related uplink data to the base station. Generally, the radio frequency circuit includes but is not limited to an antenna, at least one amplifier, a transceiver, a coupler, a low noise amplifier, a duplexer, and the like. In addition, the radio frequency circuit 702 may further communicate with another device through wireless communication. Any communications standard or protocol may be used for the wireless communication, and includes but is not limited to a global system for mobile communications, a general packet radio service, code division multiple access, wideband code division multiple access, long term evolution, and the like.

The memory 703 is configured to store an application program and data. The processor 701 runs the application program and the data that are stored in the memory 703, to execute various functions of the mobile phone 700 and process data. The memory 703 mainly includes a program storage area and a data storage area. The program storage area may store an operating system, and an application program required by at least one function (for example, a client used to control the first device 500). The data storage area may store data (for example, audio data or a phonebook) created based on use of the mobile phone 700. In addition, the memory 703 may include a RAM, or may include a nonvolatile memory such as a magnetic disk storage device and a flash memory device, or another volatile solid-state storage device. The memory 703 may store various operating systems. The memory 703 may be independent, and is connected to the processor 701 by using the communications bus, or the memory 703 may be integrated with the processor 701.

The touchscreen 704 may specifically include a touchpad 704-1 and a display 704-2.

The touchpad 704-1 may collect a touch event performed by a user on or near the mobile phone 700 (for example, an operation performed by the user on the touchpad 704-1 or near the touchpad 704-1 by using any suitable object such as a finger or a stylus), and send collected touch information to another component (such as the processor 701). The touch event performed by the user near the touchpad 704-1 may be referred to as a floating touch. The floating touch may mean that the user does not need to directly touch the touchpad to select, move, or drag a target (for example, an icon), and the user needs only to be near the device to implement a desired function. In addition, the touchpad 704-1 may be implemented in a plurality of types such as a resistive type, a capacitive type, an infrared type, and a surface acoustic wave type.

The display 704-2 (or referred to as a display) may be configured to display information entered by the user or information provided for the user and various menus of the mobile phone 700. The display 704-2 may be configured in a form such as a liquid crystal display or an organic light emitting diode. The touchpad 704-1 may cover the display 704-2. When detecting a touch event on or near the touchpad 704-1, the touchpad 704-1 transfers the touch event to the processor 701 to determine a type of the touch event. Then, the processor 701 may provide a corresponding visual output on the display 704-2 based on the type of the touch operation.

It should be noted that although in FIG. 7, the touchpad 704-1 and the display 704-2 are used as two independent components to implement input and output functions of the mobile phone 700, in some embodiments, the touchpad 704-1 and the display 704-2 may be integrated to implement the input and output functions of the mobile phone 700. It may be understood that the touchscreen 704 is formed by stacking a plurality of layers of materials. Only the touchpad (layer) and the display (layer) are presented in the embodiments of this application, and other layers are not recorded in the embodiments of this application. In addition, the touchpad 704-1 may be configured on a front side of the mobile phone 700 in a full panel form, and the display 704-2 may also be configured on the front side of the mobile phone 700 in a full panel form. In this way, a bezel-less structure can be implemented on the front side of the mobile phone.

In addition, the mobile phone 700 may further have a fingerprint recognition function. For example, a fingerprint collection device (namely, a fingerprint sensor) 712 may be configured on a rear side (for example, below a rear-facing camera) of the mobile phone 700, or a fingerprint collection device 712 may be configured on a front side (for example, below the touchscreen 704) of the mobile phone 700. For another example, a fingerprint collection device 712 may be configured on the touchscreen 704 to implement the fingerprint recognition function. In other words, the fingerprint collection device 712 may be integrated into the touchscreen 704 to implement the fingerprint recognition function of the mobile phone 700. In this case, the fingerprint collection device 712 is configured on the touchscreen 704, and may be a part of the touchscreen 704, or may be configured on the touchscreen 704 in another manner. A main component of the fingerprint collection device 712 in the embodiments of this application is a fingerprint sensor. The fingerprint sensor may use any type of sensing technology that includes but is not limited to an optical sensing technology, a capacitive sensing technology, a piezoelectric sensing technology, an ultrasonic sensing technology, or the like.

The mobile phone 700 may further include the Bluetooth apparatus 705, configured to exchange data between the mobile phone 700 and another short-range device (for example, a mobile phone or a smart watch). In the embodiments of this application, the Bluetooth apparatus may be an integrated circuit, a Bluetooth chip, or the like.

Certainly, the one or more sensors 706 include but are not limited to the foregoing sensor. For example, the one or more sensors 706 may further include a light sensor, a motion sensor, and another sensor. Specifically, the optical sensor may include an ambient light sensor and a proximity sensor. The ambient light sensor may adjust luminance of the display of the touchscreen 704 based on intensity of ambient light. The proximity sensor may power off the display when the mobile phone 700 is moved to an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between a landscape screen and a vertical screen, a related game, and magnetometer posture calibration), a function related to vibration recognition (such as a pedometer and a knock), and the like. Other sensors such as a gyroscope, a barometer, a hygrometer, a thermometer, and an infrared sensor may be further configured on the mobile phone 700. Details are not described herein.

The Wi-Fi apparatus 707 is configured to provide network access complying with a Wi-Fi related standard and protocol for the mobile phone 700. The mobile phone 700 may access a Wi-Fi hotspot by using the Wi-Fi apparatus 707, to help the user receive and send emails, browse a web page, access streaming media, and the like. The Wi-Fi apparatus 707 provides wireless broadband internet access for the user. In some other embodiments, the Wi-Fi module 707 may alternatively be used as a Wi-Fi wireless access point, to provide Wi-Fi network access for another device.

The positioning apparatus 708 is configured to provide a geographic location for the mobile phone 700. It can be understood that the positioning apparatus 708 may be specifically a receiver of a positioning system such as a global positioning system (Global Positioning System, GPS), a BeiDou navigation satellite system, or a Russian GLONASS.

After receiving the geographic location sent by the positioning system, the positioning apparatus 708 sends the information to the processor 701 for processing, or sends the information to the memory 703 for storage. In some other embodiments, the positioning apparatus 708 may alternatively be a receiver of an assisted global positioning system (Assisted Global Positioning System, AGPS). The AGPS system serves as an assisted server to assist the positioning apparatus 708 in completing ranging and positioning services. In this case, the assisted positioning server communicates with a device such as the positioning apparatus 708 (namely, a GPS receiver) of the mobile phone 700, through a wireless communications network, to provide positioning assistance.

In some other embodiments, the positioning apparatus 708 may alternatively be a positioning technology based on a Wi-Fi hotspot. Because each Wi-Fi hotspot has a globally unique media access control (Media Access Control, MAC) address, the device can scan and collect broadcast signals of nearby Wi-Fi hotspots when Wi-Fi is enabled, and therefore can obtain MAC addresses that are broadcast by the Wi-Fi hotspots. The device sends, to a location server through a wireless communications network, data (for example, the MAC addresses) that can identify the Wi-Fi hotspots. The location server retrieves a geographical location of each Wi-Fi hotspot, obtains the geographical location of the device through calculation with reference to strength of the Wi-Fi broadcast signals, and sends the geographical location to the positioning apparatus 708 of the device.

The audio circuit 709, a speaker 713, and a microphone 714 may provide an audio interface between the user and the mobile phone 700. The audio circuit 709 may transmit, to the loudspeaker 713, an electrical signal converted from received audio data, and the loudspeaker 713 converts the electrical signal into a sound signal for outputting. In addition, the microphone 714 converts a collected sound signal into an electrical signal. The audio circuit 709 receives the electrical signal, converts the electrical signal into audio data, and then outputs the audio data to the RF circuit 702, to send the audio data to, for example, another mobile phone, or outputs the audio data to the memory 703 for further processing.

The peripheral interface 710 is configured to provide various interfaces for an external input/output device (for example, a keyboard, a mouse, a display externally connected to the mobile phone 100, an external memory, or a subscriber identification module card). For example, the peripheral interface 710 is connected to the mouse by using a universal serial bus (Universal Serial Bus, USB) interface, and is connected, by using a metal contact on a card slot of the subscriber identification module card, to the subscriber identification module (Subscriber Identification Module, SIM) card provided by a telecommunications operator. The peripheral interface 710 may be configured to couple the external input/output peripheral device to the processor 701 and the memory 703.

In the embodiments of this application, the mobile phone 700 may communicate with another device in a device group by using the peripheral interface 710, for example, may receive, by using the peripheral interface 710, display data sent by another device, and display the display data, and the like. This is not limited in the embodiments of this application.

The mobile phone 700 may further include the power supply apparatus 711 (for example, a battery and a power supply management chip) that supplies power to each component. The battery may be logically connected to the processor 701 by using the power supply management chip, to implement functions such as charging management, discharging management, and power consumption management by using the power supply apparatus 711.

Although not shown in FIG. 7, the mobile phone 700 may further include a camera (a front-facing camera and/or a rear-facing camera), a flash, a micro projection apparatus, a near field communications (Near Field Communication, NFC) apparatus, and the like. Details are not described herein.

Figure 8:
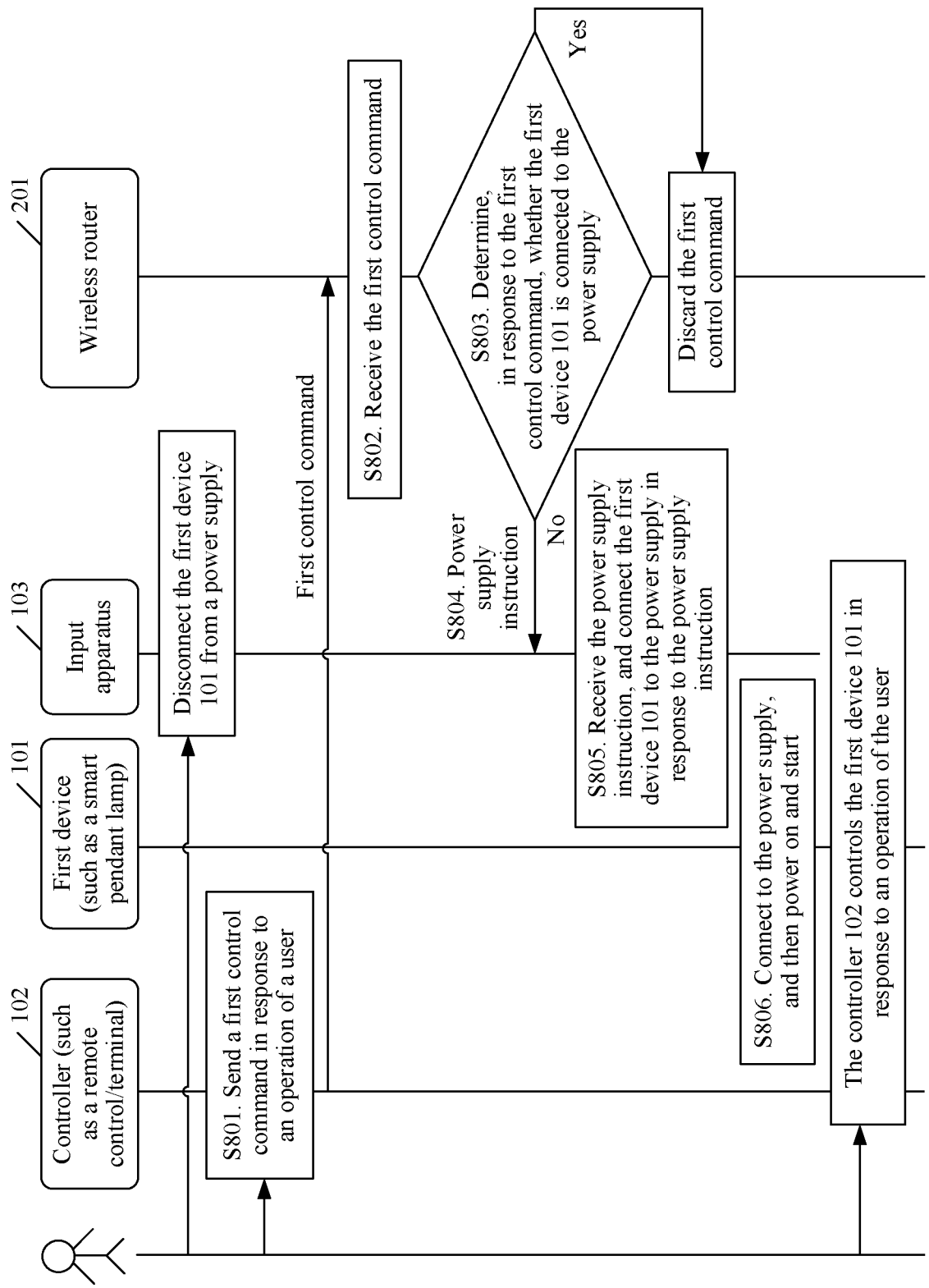
FIG. 8 is a flowchart 1 of a wireless control method according to an embodiment of this application.

With reference to the wireless control system 200 shown in FIG. 2, in the first application scenario of the embodiments of this application, as shown in FIG. 8, when a user disconnects a first device 101 from a power supply by using an input apparatus 103, the wireless control method provided in the embodiments of this application includes S801 to S806.

S801. A controller 102 sends a first control command in response to an operation of the user.

The controller 102 may send, in response to different operations of the user, control commands used to control the first device 101 to execute different events. For example, the first control command may be sent by the controller 102 in response to a press operation performed by the user on a function key (or a function button) that is on the controller 102 and that is used to control the first device 101 to execute different events. For example, the function key may be a power key. Alternatively, when the first device 101 is a smart television, the function key may be a volume adjustment key.

In this embodiment of this application, when the first device 101 is not connected to the power supply, if the user needs to control the first device 101 by using the controller 102, the user may operate any function key that is on the controller 102 and that is used to control the first device 101, so that the controller 102 sends a control command used to control the first device 101 to execute an event corresponding to the any function key. A third device (for example, a wireless router 201) may listen to and receive the control command, and then instruct, according to the control command, the input apparatus 103 to connect the first device 101 to the power supply, so that the user controls the first device 101 by using the controller 102.

In an implementation, the first device 101 and the input apparatus 103 may access a Wi-Fi network provided by the wireless router 201. The first control command may be carried in a first Wi-Fi frame. Specifically, the first control command may include a first characteristic value, and the first characteristic value is used to instruct the first device 101 to execute a corresponding event. Different first characteristic values indicate different events.

The first Wi-Fi frame in this embodiment of this application may be a management frame (Management Frame) in IEEE 802.11, for example, a probe request frame (Probe Request frame).

Figure 9:
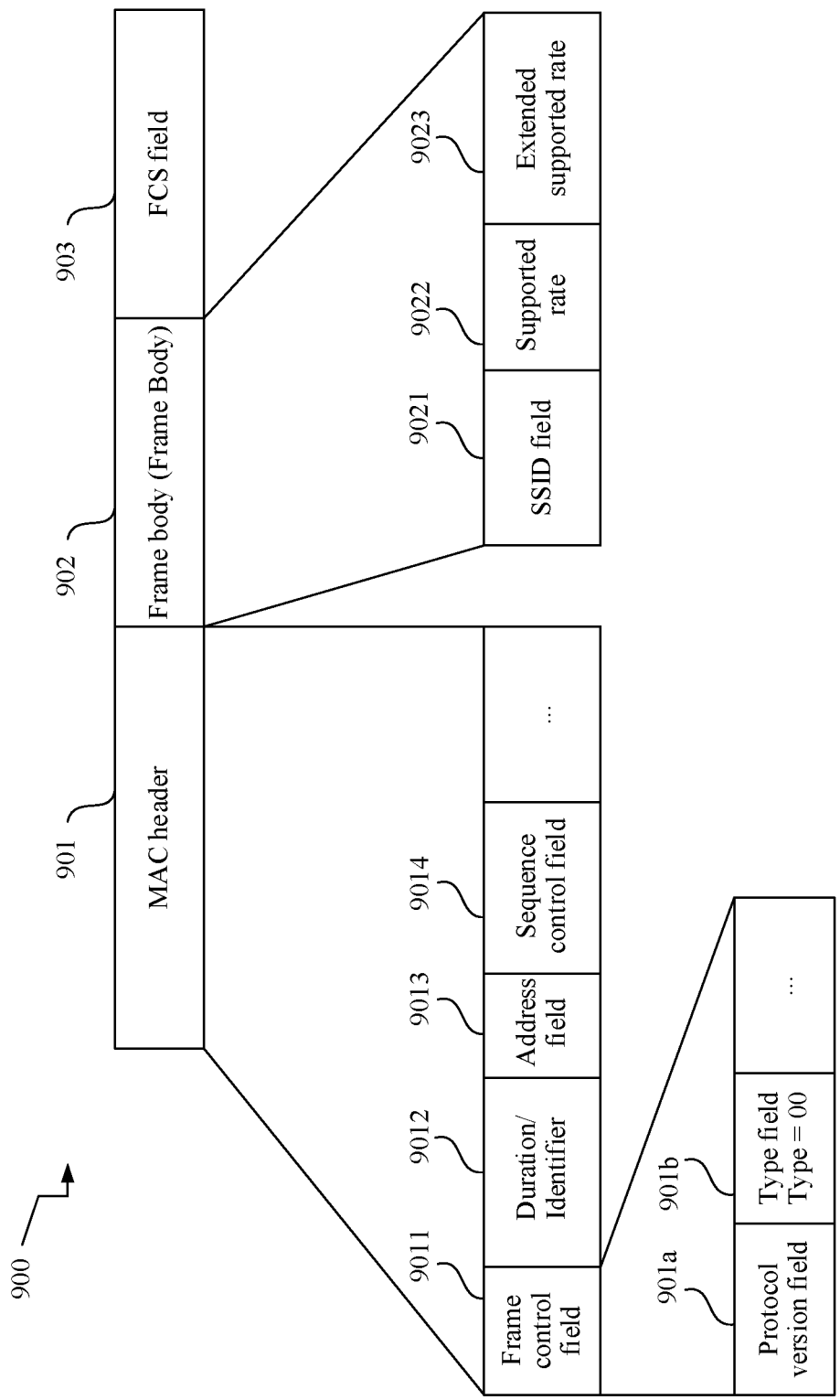
FIG. 9 is a schematic diagram of a frame structure of a Wi-Fi frame according to an embodiment of this application.

FIG. 9 is a schematic diagram of an example of a frame structure of a probe request frame according to this application. As shown in FIG. 9, the probe request frame 900 may include a frame header (that is, a MAC header) 901, a frame body (Frame Body) 902, and a frame check sequence (Frame Check Sequence, FCS) field 903.

The MAC header 901 is a media access control (Media Access Control, MAC) header. As shown in FIG. 9, the MAC header 901 may include a frame control (Frame Control) field 9011, duration/an ID (Duration/ID) 9012, an address (Address) field 9013, a sequence control (Sequence Control) field 9014, and the like.

The frame control field 9011 may include a protocol version (Protocol Version) field 901a and a type field 901b. The protocol version field 901a is used to indicate a protocol version to which the probe request frame 900 conforms, and the protocol version is usually 0. The type field 901b may include a type and a subtype. The type is used to indicate that a corresponding frame is a management frame, a data frame, or a control frame, and the subtype is used to indicate a subtype of the frame. For example, when type=00, it may indicate that a corresponding frame is a management frame. When type=00, the subtype may indicate which one of management frames such as a beacon (Beacon) frame, a probe request frame, and a probe response (Probe Response) frame the management frame is. The address field 9013 may include address information such as a source address, a destination address, an address of a transmission workstation, and an address of a receiving workstation. The destination address may be any one of a unicast address (Unicast address), a multicast address (Multicast address), and a broadcast address (Broadcast address).

As shown in FIG. 9, the frame body 902 includes an SSID field 9021, a supported rate (Supported Rates) 9022, and an extended supported rate (Extended Supported Rates) 9023. The supported rate 9022 and the extended supported rate 9023 are used to indicate a set of rates supported by a mobile phone or a wireless router. The first characteristic value in this embodiment of this application may be carried in the SSID field 9021 of the frame body 902. Alternatively, the frame body 902 may further include a reserved field, and the first characteristic value may be carried in the reserved field.

In this embodiment of this application, the controller 102 may broadcast the Wi-Fi frame that carries the first control command. The probe request frame broadcast by the controller 102 is a Wi-Fi management frame. Therefore, the wireless router 201 may listen to and receive the probe request frame. In this way, even if the first device is not connected to the power supply and a Wi-Fi module of the first device cannot listen to and receive the probe request frame, the wireless router 201 can still receive the probe request frame, so that the input apparatus 103 of the first device 101 can be controlled to connect the first device 101 to the power supply.

In another implementation, the wireless router 201 and the first device 101 each may establish a Bluetooth connection to the controller 102. The controller 102 may broadcast a Bluetooth signal that carries the first control command. In this way, even if the first device is not connected to the power supply and a Bluetooth module of the first device cannot listen to and receive the Bluetooth signal, the wireless router 201 can still receive the Bluetooth signal, so that the input apparatus 103 of the first device 101 can be controlled to connect the first device 101 to the power supply.

In this embodiment of this application, the method in this embodiment of this application is subsequently described by using an example in which the first control command is carried in the first Wi-Fi frame. Specifically, after S802, the method in this embodiment of this application may further include S802 to S807.

S802. The wireless router 201 receives the first control command.

The first control command may further include a second characteristic value. The second characteristic value is used to indicate that the first control command is a command used to control the first device 101. For example, the second characteristic value may be an identifier of the first device 101 or an address (for example, a MAC address) of the first device 101. Alternatively, the second characteristic value is used to indicate that a destination address of the first Wi-Fi frame is an address of the first device 101.

In an embodiment of this application, the first characteristic value and the second characteristic value may be a same characteristic value. In this case, the second characteristic value (or the first characteristic value) is not the identifier of the first device 101, the address of the first device 101, or the like. The second characteristic value may be not only used to indicate a to-be-executed event, but also used to indicate that a device that executes the event is the first device 101. For example, the second characteristic value may include values of a plurality of bits (for example, "abcd"), and the values of the plurality of bits may be used to indicate a to-be-executed event and a device that executes the event. Herein, "ab" may be used to indicate the to-be-executed event, and "cd" may be used to indicate the device that executes the event. For example, assuming that the to-be-executed event indicated when "ab" is "01" is turning down volume, and the device indicated when "cd" is "10" is the first device 104, when the second characteristic value may be "0110", the first device 104 may be instructed to turn down the volume.

For example, the second characteristic value may be carried in the address field 9013 of the probe request frame shown in FIG. 6.

After receiving the first control command, the wireless router 201 may determine, based on the second characteristic value included in the first control command, that the first control command is the command used to control the first device 101.

S803. The wireless router 201 determines, in response to the first control command, whether the first device 101 is connected to the power supply.

After identifying that the first control command is the command used to control the first device 101, the wireless router 201 may determine whether the first device 101 is connected to the power supply.

In an implementation, the wireless router 201 may determine, based on a network connection status of the first device 101, whether the first device 101 is powered off. Specifically, a method for determining, by the wireless router 201 in response to the first control command, that the first device 101 is not connected to the power supply may include S803a.

S803a. When the network connection status of the first device 101 is an unconnected mode, the wireless router 201 determines that the first device 101 is not connected to the power supply.

For example, a network connection status is a status about whether a device is connected to a Wi-Fi network. The wireless router 201 may store statuses about whether a plurality of devices are connected to the Wi-Fi network provided by the wireless router 201. The status about whether the device is connected to the Wi-Fi network may be a connected mode or an unconnected mode. When a device is in connected mode, it indicates that the device is connected to a Wi-Fi network, and a Wi-Fi module of the device may receive a Wi-Fi frame sent by another device. When a device is in unconnected mode, it indicates that the device is not connected to a Wi-Fi network, and a Wi-Fi module of the device cannot receive a Wi-Fi frame sent by another device. There are two reasons that cause the device to be in unconnected mode: (1) The device is powered off (2) The device is not connected to the Wi-Fi network. The wireless router 201 can detect only whether the device is connected to the Wi-Fi network, but cannot further determine a reason why the device is in unconnected mode, when it is determined that the device is in unconnected mode. Therefore, in this embodiment of this application, when determining that the device is in unconnected mode, the wireless router considers by default that the device is powered off.

For example, Table 1 shows a schematic table of an example of a Wi-Fi network connection status, of each device, that is stored in the wireless router 201.

TABLE 1

| Device | Wi-Fi network connection status |
| --- | --- |
| Device 1 | Connected mode |
| Device 2 | Unconnected mode |
| First device | Unconnected mode |
| . . . | . . . |
| Device n | Connected mode |

When a device is connected to a Wi-Fi hotspot provided by the wireless router 201, the wireless router 201 may update a Wi-Fi network connection status of the device to a "connected mode". When the device is disconnected from the Wi-Fi hotspot provided by the wireless router, the wireless router may update the Wi-Fi network connection status of the device to an "unconnected mode".

In this embodiment of this application, the wireless router 201 may determine, by querying a connection status of the first device, whether the first device 101 is powered off. As shown in Table 1, when finding that the first device 101 is in unconnected mode, the wireless router 201 may determine that the first device 101 is powered off, in other words, the first device 101 is not connected to the power supply. When finding that the first device 101 is in connected mode, the wireless router 201 may determine that the first device 101 is not powered off, in other words, the first device 101 is connected to the power supply.

In another implementation, the wireless router 201 may determine, by using the input apparatus 103, that the first device 101 is not connected to the power supply. Specifically, the wireless router 201 may receive power supply status information of the first device 101 that is reported by the input apparatus 103, and the power supply status information is used to indicate that the first device 101 is connected to the power supply or not connected to the power supply. For example, power supply status information "1" is used to indicate that the first device 101 is connected to the power supply, and power supply status information "0" is used to indicate that the first device 101 is not connected to the power supply.

The input apparatus 103 may report the power supply status information of the first device 101 to the wireless router 201 when a power supply status of the first device 101 changes. For example, when the input apparatus 103 disconnects a power supply path between the first device 101 and the power supply in response to an operation of the user, the input apparatus 103 may send, to the wireless router 201, the power supply status information used to indicate that the first device 101 is not connected to the power supply. When the input apparatus 103 connects the first device 101 to the power supply in response to an operation of the user, the input apparatus 103 may send, to the wireless router 201, the power supply status information used to indicate that the first device 101 is connected to the power supply.

Specifically, when the wireless router 201 determines that the first device 101 is not connected to the power supply, the wireless router 201 may continue to perform S804. When the wireless router 201 determines that the first device is connected to the power supply, the wireless router 201 may discard the first control command.

S804. The wireless router 201 sends a power supply instruction to the input apparatus 103.

The power supply instruction is used to instruct the input apparatus 103 to connect the first device 101 to the power supply. When a communications module of the input apparatus 103 is a Wi-Fi module, the power supply instruction may be a Wi-Fi frame. When there is a wired connection (for example, a power line or network cable connection) between the wireless router 201 and the input apparatus 103, the power supply instruction may be a signal sent by the wireless router 201 to the input apparatus 103 through an interface between the wireless router 201 and the input apparatus 103. When a communications module of the input apparatus is a Bluetooth module, the power supply instruction may be a Bluetooth signal.

It may be understood that, the user disconnects the first device 101 from the power supply by using the input apparatus 103 (in other words, the first device 101 is not connected to the power supply), and a wireless communications module of the first device 101 cannot listen to and receive the first control command. However, the communications module of the input apparatus 103 may still receive the power supply instruction sent by the wireless router 201. For example, the Wi-Fi module of the input apparatus 103 may still receive a Wi-Fi frame sent by the wireless router 201. Therefore, after receiving the first control command and determining that the first device 101 is not connected to the power supply, the wireless router 201 may send the power supply instruction to the input apparatus 103 of the first device 101, to instruct the input apparatus 103 to connect the first device to the power supply.

S805. The input apparatus 103 receives the power supply instruction, and connects the first device 101 to the power supply in response to the power supply instruction.

When receiving the power supply instruction, the communications module of the input apparatus 103 may implement "connection" and "disconnection" control on a control circuit (namely, the power supply path between the first device 101 and the power supply), and connect the power supply path between the first device 101 and the power supply, so that the first device 101 is connected to the power supply. In this way, after the first device 101 is powered on and started, the controller 102 may control the first device 101 by sending a Wi-Fi frame.

S806. The first device 101 is connected to the power supply and then is powered on and started.

For example, the wireless communications module of the first device 101 is a Wi-Fi module. After the first device 101 is powered on and started, the first device 101 may access the Wi-Fi network provided by the wireless router 201, so that the first device 101 may receive a Wi-Fi frame sent by another device. In this way, the controller 102 can control the first device 101 in response to an operation of the user.

It may be understood that, after a preset time period starting from a time at which the wireless router 201 sends the power supply instruction to the input apparatus 103, the first device 101 may be connected to the power supply, powered on, and started, and access the Wi-Fi network provided by the wireless router 201, and the Wi-Fi module of the first device 101 may receive a Wi-Fi frame. Based on this, to prevent the user from operating the controller 102 to repeatedly send the first Wi-Fi frame to the first device 101, the wireless router 201 may send the first Wi-Fi frame to the first device 101 after the preset time period starting from the time of sending the power supply instruction to the input apparatus 103, to instruct the first device to execute an event indicated by the first Wi-Fi frame.

Optionally, after the first device 101 accesses the Wi-Fi network provided by the wireless router 201, the method in this embodiment of this application may further include: sending, by the wireless router 201, the first control command to the first device 101; and receiving, by the first device 101, the first control command sent by the wireless router 201, and executing, in response to receiving the first control command, an event indicated by the first control command.

In this embodiment of this application, for a method in which the first device 101 receives a control command and executes an event indicated by the control command, refer to a specific method in which a device receives a control command and executes an event indicated by the control command in a conventional technology. Details are not described herein in this embodiment of this application.

In the wireless control method provided in this embodiment of this application, the user disconnects the first device 101 from the power supply by using the input apparatus 103 (in other words, the first device 101 is not connected to the power supply), and the wireless communications module of the first device 101 cannot receive the first control command. However, the wireless router 201 may receive the first control command, and the communications module of the input apparatus 103 may still receive a message or a command. Therefore, after receiving the first control command and determining that the first device 101 is not connected to the power supply, the wireless router 201 may send the power supply instruction to the input apparatus 103 of the first device 101, to instruct the input apparatus 103 to connect the first device 101 to the power supply. In this way, after the first device 101 is connected to the power supply, the first device 101 may receive the first control command, so that the controller 102 may control the first device 101 in response to an operation of the user. In other words, according to this solution, when a power switch of the first device 101 is turned off, the first device 101 may be controlled by the controller 102.

In an embodiment of this application, the controller 102 (for example, a mobile phone) may remotely control the first device 101. To be specific, the first device 101 accesses the Wi-Fi network provided by the wireless router 201, but the controller 102 does not access the Wi-Fi network. In this case, when responding to an operation of the user, the controller 102 cannot broadcast the first Wi-Fi frame. In this case, the controller 102 may send the first Wi-Fi frame to the first device 101 by using the wireless router 201. After the wireless router 201 receives the first Wi-Fi frame, if the wireless router 201 identifies that the first Wi-Fi frame is a Wi-Fi frame used to control the first device 101, and determines that the first device is not connected to the power supply, the wireless router 201 may send the power supply instruction to the input apparatus 103 of the first device 101, to instruct the input apparatus 103 to connect the first device 101 to the power supply. When receiving the power supply instruction, the communications module of the input apparatus 103 may implement "connection" and "disconnection" control on the power supply path between the first device 101 and the power supply, and connect the power supply path between the first device 101 and the power supply, so that the first device 101 is connected to the power supply. In this way, after the first device 101 is powered on and started and accesses the Wi-Fi network, the Wi-Fi module of the first device 101 may receive the Wi-Fi frame, so that the controller 102 may control the first device 101 to execute the event. In other words, when the power switch of the first device 101 is turned off, the first device 101 may be remotely controlled by the controller 102.

It may be understood that, the wireless router 201 determines whether the first device 101 is connected to the power supply, and controls the input apparatus 103 to implement "connection" and "disconnection" control on the power supply path between the first device 101 and the power supply. This increases load of the wireless router 201, a service on the wireless router 201 may be affected, and transmission of another service is affected. Based on this, with reference to the wireless control system 300 shown in FIG. 3, in the second application scenario of the embodiments of this application, after receiving a first control command, a wireless router 301 may forward the first control command to a server 302, and the server 302 determines whether the first device 101 is connected to the power supply, and controls the input apparatus 103 to implement "connection" and "disconnection" control on the power supply path between the first device 101 and the power supply.

Figure 10B:
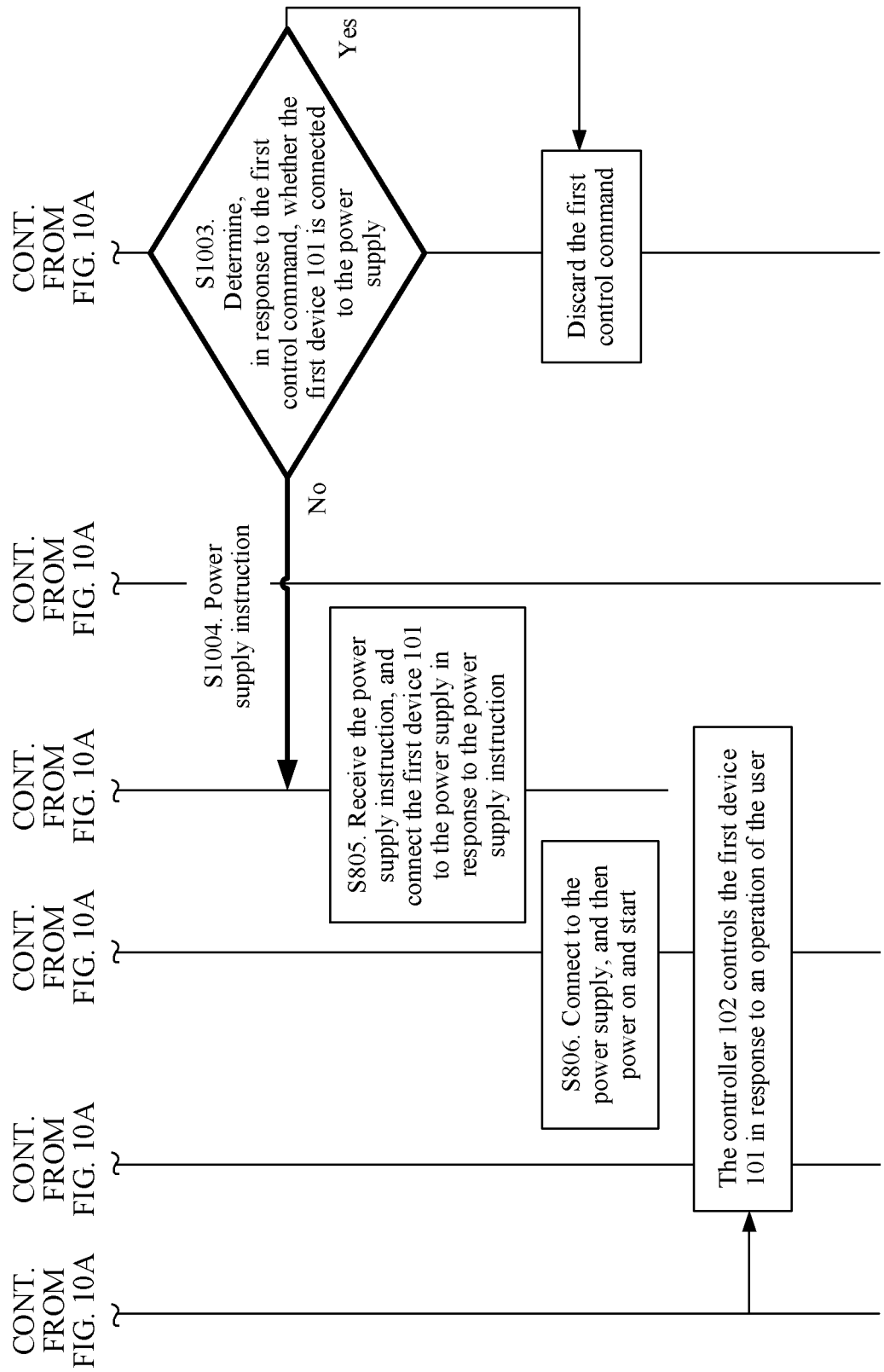

Specifically, in the second application scenario, as shown in FIG. 10A and FIG. 10B, when a user disconnects a first device from a power supply to by using an input apparatus, a wireless control method provided in the embodiments of this application includes S801 and S802, S1001 to S1004, and S805 and S806.

S1001. A wireless router 301 sends a first control command to a server 302.

It may be understood that a controller 102 may communicate with the wireless router 301 by using a Wi-Fi network or Bluetooth. To be specific, the wireless router 301 may receive a Wi-Fi frame or a Bluetooth signal sent by the controller 102, and the wireless router 301 may communicate with the server 302 by using a wired path such as an optical fiber. Therefore, after receiving a first Wi-Fi frame or a Bluetooth signal that carries the first control command, the wireless router 301 cannot directly forward the first Wi-Fi frame or the Bluetooth signal to the server 302. Instead, the wireless router 301 encapsulates the first control command carried in the first Wi-Fi frame or the Bluetooth signal into a first message that complies with a communications protocol of the wireless router 301 and the server 302, and then sends the first message to the server 302. The wireless router 301 adds the first control command to the first message and transmits the first message to the server 302.

S1002. The server 302 receives the first control command sent by the wireless router 301.

S1003. The server 302 determines, in response to the first control command, whether a first device 101 is connected to a power supply.

In an implementation, when a network connection status of the first device 101 is an unconnected mode, the server 302 may determine that the first device 101 is not connected to the power supply. The server 302 may receive and store network connection statuses of a plurality of devices that are reported by the wireless router 301. The wireless router 301 may periodically report a network connection status of each device to the server 302. Alternatively, the wireless router 301 may report a changed network connection status of a device to the server 302 when a network connection status of the device changes.

In another implementation, the server 302 may determine, by using an input apparatus 103, that the first device 101 is not connected to the power supply. For a specific method in which the server 302 determines, by using the input apparatus 103, that the first device 101 is not connected to the power supply, refer to the method in which the wireless router 201 determines, by using the input apparatus 103, that the first device 101 is not connected to the power supply. Details are not described herein again in this embodiment of this application.

Specifically, when the server 30 determines that the first device 101 is not connected to the power supply, the server 30 may continue to perform S1004. When the server 30 determines that the first device is connected to the power supply, the server 30 may discard the first control command.

S1004. The server 302 sends a power supply instruction to the input apparatus 103.

The server 302 may send the power supply instruction to the input apparatus 103 by using the wireless router 301. It may be understood that the server 302 may communicate with the wireless router 301 by using a wired path such as an optical fiber, and the wireless router 301 may communicate with the input apparatus 103 by using a Wi-Fi network, Bluetooth, or a wired path. Therefore, the power supply instruction received by the wireless router 301 from the server 302 may be carried in a second message that complies with a communications protocol of the wireless router 301 and the server 302. When forwarding the second message from the server 302 to the input apparatus 103, the wireless router 301 needs to encapsulate the first control command carried in the second message into a third message (for example, a Wi-Fi frame, a Bluetooth signal, or a signal transmitted on a wired path) that complies with a communications protocol of the wireless router 301 and the input apparatus 102, and then sends, to the server 302, the third message that carries the power supply instruction.

After S1004, the method in this embodiment of this application may further include S805 and S806. It should be noted that, in the second application scenario, as shown in FIG. 10A and FIG. 10B, the wireless router 301 performs S802.

In this embodiment of this application, after receiving the first control command, the wireless router 301 only needs to forward the first control command to the server 302, and send the power supply instruction to the input apparatus 103 when receiving the power supply instruction sent by the server 302. The wireless router 301 does not need to determine whether the first device 101 is connected to the power supply. Because accessing the wireless router 301 and forwarding data are originally within a service scope of the wireless router 301. Therefore, forwarding the data by the wireless router 301 does not additionally increase load of the wireless router 301, and therefore does not affect a service on the wireless router 301 or affect transmission of another service.

In conclusion, according to the method in this embodiment of this application, when the load of the wireless router 301 is not increased, the first device 101 may be controlled by the controller 102 when the first device 101 is not connected to the power supply.

Figure 11A:
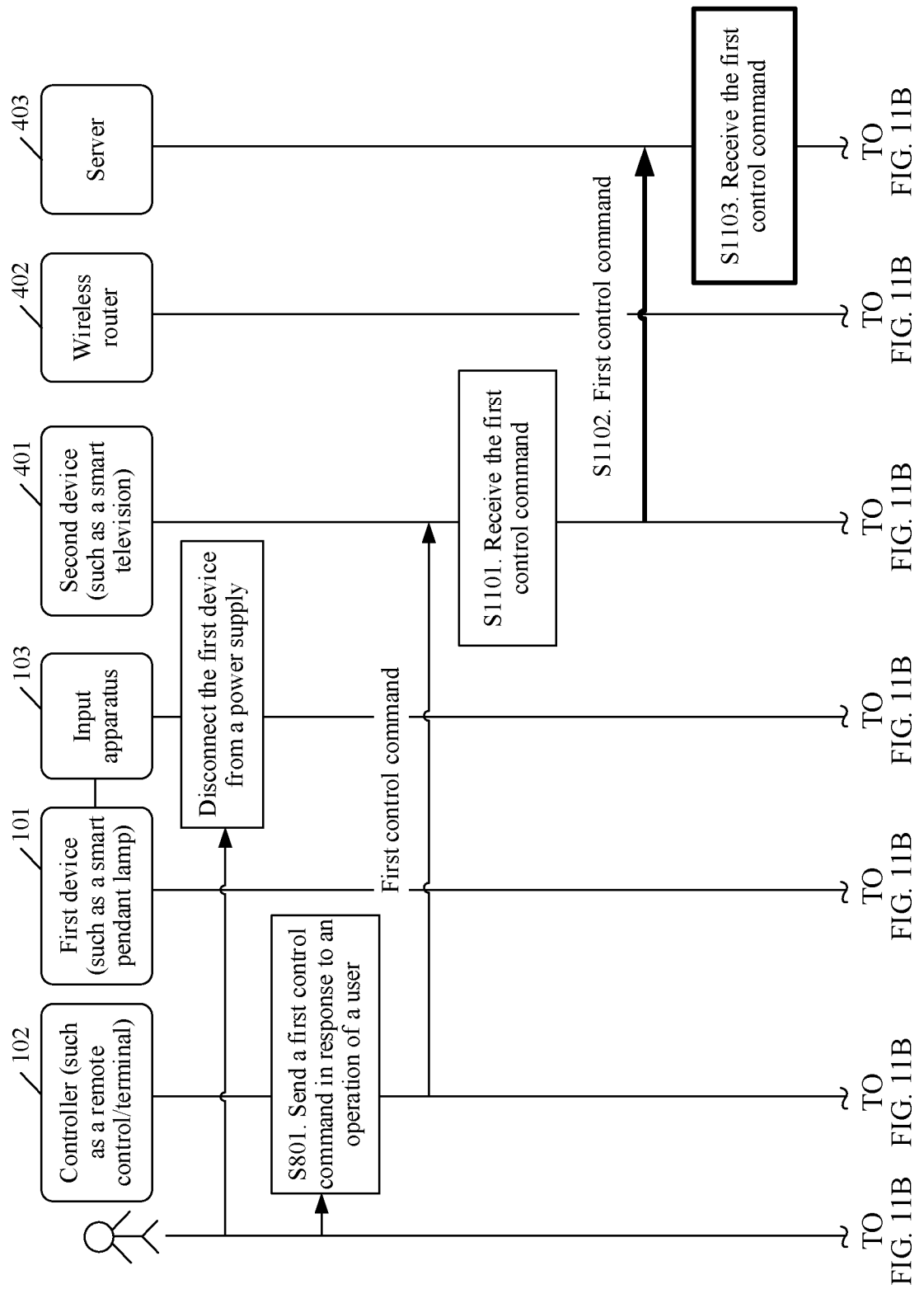
FIG. 11A and FIG. 11B are a flowchart 3 of a wireless control method according to an embodiment of this application.
Figure 11B:
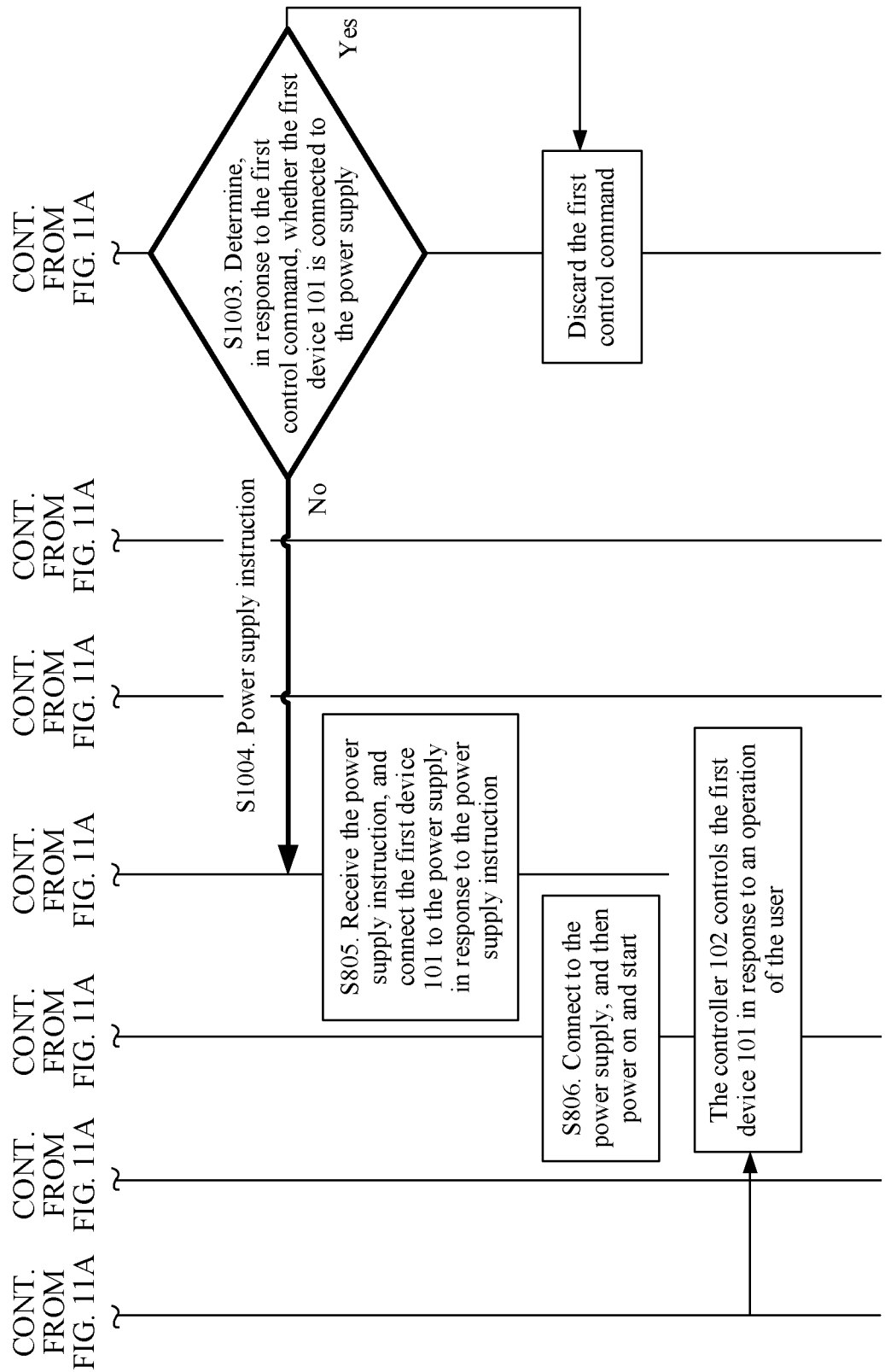

Further, with reference to the wireless control system 400 shown in FIG. 4, in the third application scenario of the embodiments of this application, as shown in FIG. 11A and FIG. 11B, when a user disconnects a first device from a power supply by using an input apparatus, a wireless control method provided in the embodiments of this application includes S801, S1101 to S1103, S1003, S1004, S805, and S806.

S1101. A second device 401 receives a first control command.

For a specific method in which the second device 401 receives the first control command, refer to the method in which the wireless router 201 receives the first control command in S802. Details are not described herein again in this embodiment of this application.

S1102. The second device 401 forwards the first control command to a server 403.

The second device may transparently transmit the first control command to a wireless router 402 in a wired or wireless manner, to request the wireless router 402 to forward the first control command to the server 403.

S1103. The server 403 receives the first control command sent by the second device 401.

After S1103, the method in this embodiment of this application may further include S1003, S1004, S805, and S806. It should be noted that, in the third application scenario, as shown in FIG. 11A and FIG. 11B, the server 403 performs S1003 and S1004.

According to the wireless control method provided in this embodiment of this application, when a first device 101 is not connected to a power supply, the first device 101 may be controlled by a controller 102. In addition, when the first device 101 is controlled by the controller 102 to be disconnected from the power supply, the second device 401 receives the first control command, and the server 403 determines whether the first device 101 is connected to the power supply. This does not additionally increase load of the wireless router 301. According to the method in this embodiment of this application, when the load of the wireless router 301 is not increased, the first device 101 may be controlled by the controller 102 when the first device 101 is not connected to the power supply.

Figure 12:
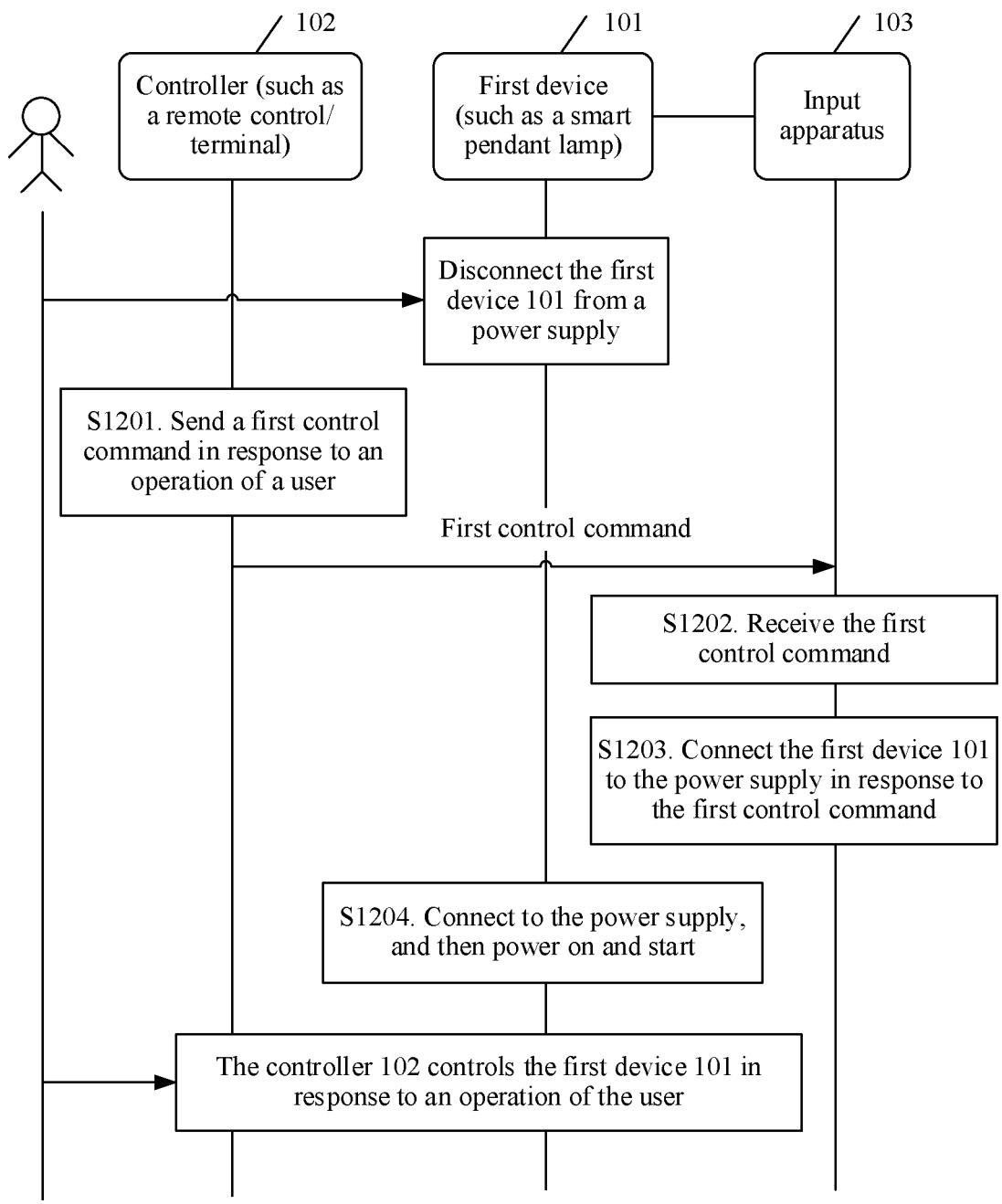
FIG. 12 is a flowchart 4 of a wireless control method according to an embodiment of this application.

In the fourth application scenario of the embodiments of this application, with reference to the wireless control system 100 shown in FIG. 1, the input apparatus 103 may listen to and receive the first control command used to control the first device 101, then determine whether the first device 101 is connected to the power supply, and implement "connection" and "disconnection" control on the power supply path between the first device 101 and the power supply. Specifically, in the fourth application scenario, as shown in FIG. 12, when a user disconnects a first device from a power supply to by using an input apparatus, a wireless control method provided in the embodiment of this application includes S1201 to S1204 and S806 and S807.

S1201. A controller 102 sends a first control command in response to an operation of the user.

S1202. An input apparatus 103 receives the first control command.

S1203. The input apparatus 103 connects a first device 101 to a power supply in response to the first control command.

In the fourth application scenario, the first control command sent by the controller 102 may be an infrared signal, and both the input apparatus 103 and the first device 101 connected to the power supply can identify the infrared signal. If the first device 101 is not connected to the power supply, the first device 101 cannot receive the infrared signal. However, the input apparatus 103 may receive the infrared signal, and connect the first device 101 to the power supply. Alternatively, the first control command may be a Bluetooth signal or a Wi-Fi frame. When the first control command is a Bluetooth signal or a Wi-Fi frame, for a specific method in which the input apparatus 103 receives the first control command, refer to the method in which the wireless router 201 receives the first control command in S802. Details are not described herein again in this embodiment of this application.

The input apparatus 103 is configured to control connection and disconnection of the power supply of the first device 101. In response to the first control command, regardless of whether the first device 101 is connected to the power supply, the input apparatus 103 only needs to control a power supply path between the first device 101 and the power supply to be connected. In other words, after receiving the first control command, the input apparatus 103 does not need to determine whether the first device 101 is connected to the power supply, and in response to the first control command, the input apparatus 103 only needs to control the power supply path between the first device 101 and the power supply to be connected.

Certainly, after receiving the first control command, the input apparatus 103 may alternatively determine whether the first device 101 is connected to the power supply. When the first device 101 is not connected to the power supply, the input apparatus 103 connects the first device 101 to the power supply. When the first device 101 is connected to the power supply, the input apparatus 103 may perform no operation.

S1204. The first device 101 is connected to the power supply and then is powered on and started.

After the first device 101 is connected to the power supply and is powered on and started, a controller 102 may control the first device 101 in response to an operation of the user.

According to the wireless control method provided in this embodiment of this application, the user disconnects the first device 101 from the power supply by using the input apparatus 103, and a wireless communications module of the first device 101 cannot listen to and receive the first control command. However, a communications module of the input apparatus 103 may still receive the first control command, and may connect the first device 101 to the power supply in response to the first control command. In this way, after the first device 101 is connected to the power supply and is powered on and started, the controller 102 may control the first device 101 in response to an operation of the user. In other words, according to this solution, when the first device 101 is not connected to the power supply, the first device 101 may be controlled by the controller 102.

In another embodiment of this application, one or more sensors may be disposed on the input apparatus 103, and the one or more sensors may include a light sensor, a temperature sensor, and another sensor. Specifically, the light sensor may include a proximity sensor. When the proximity sensor detects that a user approaches the input apparatus 103, the input apparatus 103 may automatically connect the first device 101 to the power supply. For example, assuming that the first device 101 is a smart pendant lamp, an intelligent switch (namely, the input apparatus 103) of the smart pendant lamp may automatically connect the smart pendant lamp to a power supply when detecting that the user approaches the intelligent switch. Specifically, when the user is at home, the user walks at random and may approach an intelligent switch (namely, the input apparatus 103) of any household device (the first device 101), and the user may use any household device at any time. If intelligent switches of the household devices can automatically connect the corresponding home devices to power supplies after detecting proximity of the user, a household device is powered on and started after being connected to a power supply, so that a controller 102 of the household device can control the home device at any time in response to an operation of the user.

It can be understood that, to implement the foregoing functions, the input apparatus, the wireless router, and the server include corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the terminal may be divided into function modules based on the foregoing method examples. For example, function modules corresponding to the functions may be obtained through division, or two or more functions may be integrated into one processing module. The integrated module may be implemented in a form of hardware, or may be implemented in a form of a software function module. It should be noted that, in this embodiment of this application, division into the modules is an example, and is merely a logical function division. In actual implementation, another division manner may be used.

Figure 13:
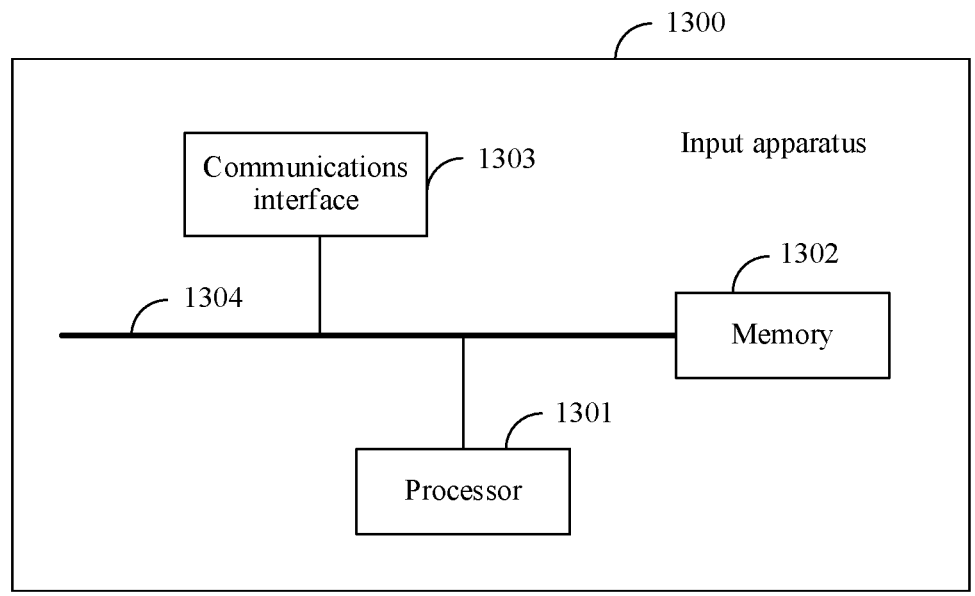
FIG. 13 is a schematic structural diagram of composition of an input apparatus according to an embodiment of this application.

As shown in FIG. 13, an embodiment of this application provides an input apparatus 1300. The input apparatus 1300 includes a processor 1301, a memory 1302, and a communications interface 1303. The communications interface 1303 and the memory 1302 are coupled to the processor 1301. The communications interface 1303 is configured to receive and send data. The memory 1302 includes a nonvolatile storage medium. The memory 1302 is configured to store computer program code. The computer program code includes a computer instruction. When the processor 1301 executes the computer instruction, the communications interface 1303 is configured to receive a first control command or a first control command. A power supply connect instruction is used to instruct the input apparatus to connect a first device to a power supply. The communications interface 1303 and the memory 1302 are connected to the processor 1301 by using a bus (a black bold line 1304 shown in FIG. 13).

Specifically, the communications interface 1303 is configured to support the input apparatus 1300 in performing the operation of receiving a power supply instruction in S805 and S1202 in the foregoing method embodiments, and/or another process of the technology described in this specification. The processor 1301 is configured to support the input apparatus 1300 in performing the operation of connecting the first device to the power supply in S805 and S1203 in the foregoing method embodiments, and/or another process of the technology described in this specification.

The processor 1301 may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications interface 1303 may be a transceiver, a transceiver circuit, or the like.

When the processor 1301 includes the switch module 601 shown in FIG. 6, and the communications interface 1303 is the communications module 602 shown in FIG. 6, the input apparatus 1300 provided in this application may be the input apparatus 600 shown in FIG. 6. The communications interface 1303 may include a radio frequency circuit, a Wi-Fi module, and a Bluetooth module. The communications modules such as the radio frequency circuit, the Wi-Fi module, and the Bluetooth module may be collectively referred to as a communications interface.

An embodiment of this application further provides a computer storage medium. The computer storage medium stores computer program code. When the processor executes the computer program code, the input apparatus performs related method steps in any one of FIG. 8, FIG. 10A and FIG. 10B, FIG. 11A and FIG. 11B, and FIG. 12 to implement the method in the foregoing embodiments.

An embodiment of this application further provides a computer program product. When the computer program product is run on the input apparatus, the input apparatus performs related method steps in any one of FIG. 8, FIG. 10A and FIG. 10B, FIG. 11A and FIG. 11B, and FIG. 12 to implement the method in the foregoing embodiments.

Figure 14:
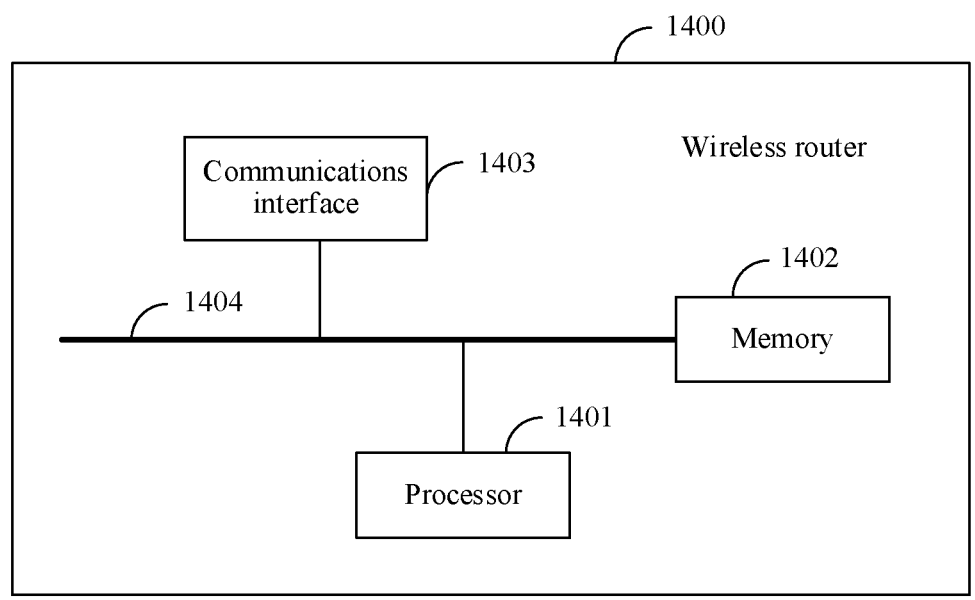
FIG. 14 is a schematic structural diagram of composition of a wireless router according to an embodiment of this application.

As shown in FIG. 14, an embodiment of this application provides a wireless router 1400. The wireless router 1400 includes a processor 1401, a memory 1402, and a communications interface 1403. The communications interface 1403 and the memory 1402 are coupled to the processor 1401. The communications interface 1403 is configured to receive and send data. The memory 1402 includes a nonvolatile storage medium. The memory 1402 is configured to store computer program code. The computer program code includes a computer instruction. When the processor 1401 executes the computer instruction, the communications interface 1403 is configured to receive a first control command. The processor 1401 is configured to: determine that a first device is not connected to a power supply, and send a power supply connect instruction to an input apparatus by using the communications interface 1403. The power supply connect instruction is used to instruct the input apparatus to connect the first device to the power supply. The communications interface 1403 and the memory 1402 are connected to the processor 1401 by using a bus (a black bold line 1404 shown in FIG. 14).

Specifically, the communications interface 1403 is configured to support the wireless router 1400 in performing S802, S804 and S1001 in the foregoing method embodiments, and/or another process of the technology described in this specification. The processor 1401 is configured to support the wireless router 1400 in performing S803 and S803a in the foregoing method embodiments, and/or another process of the technology described in this specification.

The processor 1401 may be a DSP, an ASIC, an FPGA or another programmable logic device, a transistor logic device, a hardware component, or any combination thereof. The processor may implement or execute various example logical blocks, modules, and circuits described with reference to content disclosed in this application. The processor may be alternatively a combination of processors implementing a computing function, for example, a combination of one or more microprocessors, or a combination of the DSP and a microprocessor. The communications interface 1303 may be a transceiver, a transceiver circuit, or the like.

An embodiment of this application further provides a computer storage medium. The computer storage medium stores computer program code. When the processor executes the computer program code, the wireless router performs related method steps in any one of FIG. 8, FIG. 10A and FIG. 10B, and FIG. 11A and FIG. 11B to implement the method in the foregoing embodiments.

An embodiment of this application further provides a computer program product. When the computer program product is run on the wireless router, the wireless router performs related method steps in any one of FIG. 8, FIG. 10A and FIG. 10B, and FIG. 11A and FIG. 11B to implement the method in the foregoing embodiments.

Figure 15:
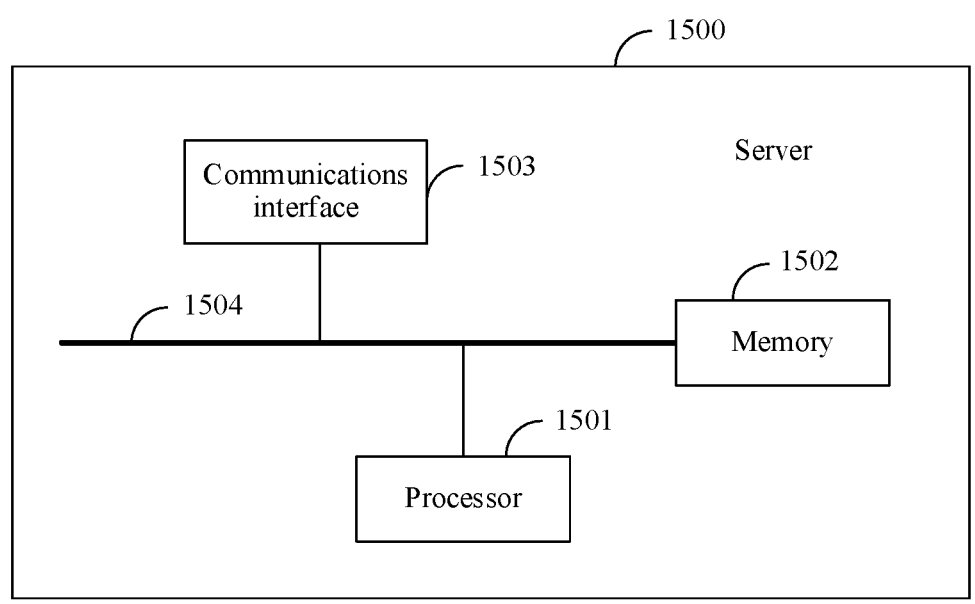
FIG. 15 is a schematic structural diagram of composition of a server according to an embodiment of this application.

As shown in FIG. 15, an embodiment of this application provides a server 1500. The server 1500 includes a processor 1501, a memory 1502, and a communications interface 1503. The communications interface 1503 and the memory 1502 are coupled to the processor 1501. The communications interface 1503 is configured to receive and send data. The memory 1502 includes a nonvolatile storage medium. The memory 1502 is configured to store computer program code. The computer program code includes a computer instruction. When the processor 1501 executes the computer instruction, the communications interface 1503 is configured to receive a first control command. The processor 1501 is configured to: determine that a first device is not connected to a power supply, and send a power supply connect instruction to an input apparatus by using the communications interface 1503. The power supply connect instruction is used to instruct the input apparatus to connect the first device to the power supply. The communications interface 1503 and the memory 1502 are connected to the processor 1501 by using a bus (a black bold line 1504 shown in FIG. 15).

Specifically, the communications interface 1503 is configured to support the server 1500 in performing S1002, S1004, and S1103 in the foregoing method embodiments, and/or another process of the technology described in this specification. The processor 1501 is configured to support the server 1500 in performing S1003 in the foregoing method embodiments, and/or another process of the technology described in this specification.

The processor 1501 may be a DSP, an ASIC, an FPGA or another programmable logic device, a transistor logic device, a hardware component, or any combination thereof. The processor may implement or execute various example logical blocks, modules, and circuits described with reference to content disclosed in this application. The processor may be alternatively a combination of processors implementing a computing function, for example, a combination of one or more microprocessors, or a combination of the DSP and a microprocessor. The communications interface 1303 may be a transceiver, a transceiver circuit, or the like.

An embodiment of this application further provides a computer storage medium. The computer storage medium stores computer program code. When the processor executes the computer program code, the server performs related method steps in FIG. 10A and FIG. 10B or FIG. 11A and FIG. 11B to implement the method in the foregoing embodiments.

An embodiment of this application further provides a computer program product. When the computer program product is run on the server, the server performs related method steps in FIG. 10A and FIG. 10B or FIG. 11A and FIG. 11B to implement the method in the foregoing embodiments.

The input apparatus 1300, the wireless router 1400, the server 1500, the computer storage medium, the computer program product, or the chip provided in the embodiments of this application is configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division into the foregoing function modules is merely an example for illustration. In actual application, the foregoing functions can be allocated to different modules and implemented according to a requirement, in other words, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless control method implemented by an electronic device, wherein the wireless control method comprises:

receiving, by a server from a second device through the electronic device, a first control command of a controller instructing a first device, other than the electronic device and the second device, to execute a corresponding event, wherein the first device and the second device are household devices configured when connected to a power supply to receive the control command directly from the controller, and wherein the second device is connected to the power supply;

determining, by the electronic device in response to the first control command, that the first device is not connected to the power supply either:
when a network connection status of the first device is an unconnected mode, wherein the network connection status is obtained from stored network connection statuses of respective devices; or
when receiving, from an input apparatus, power supply status information that indicates that the first device is not connected to the power supply; and receiving, by the electronic device from the server, a power supply connect instruction instructing the input apparatus to connect the first device to the power supply;

sending, to the input apparatus of the first device connected to the first device via a circuit and to the power supply in response to the determination, the power supply connect instruction instructing the input apparatus to connect the first device to the power supply, wherein the input apparatus comprises a power button or a power switch for connecting the first device to the power supply, and wherein the input apparatus connects the first device to the power supply based on the power supply connect instruction instead of the power button or power switch.

2. The wireless control method of claim 1, further comprising:
listening, at the electronic device, to a first WI-FI frame; and
receiving the first WI-FI frame that carries the first control command from the controller.

3. The wireless control method of claim 2, further comprising sending the first WI-FI frame to the first device to instruct the first device to execute an event indicated by the first WI-FI frame after connecting the first device to the power supply, wherein the electronic device is a wireless router.

4. The wireless control method of claim 1, wherein the first control command comprises an infrared signal.

5. The wireless control method of claim 1, wherein the first control command comprises a BLUETOOTH signal.

6. The wireless control method of claim 1, wherein the first control command comprises a WI-FI frame.

7. An electronic device comprising:
a memory configured to store programming instructions; and
a processor coupled to the memory, wherein the programming instructions cause the processor to be configured to:
receive, by a server from a second device through the electronic device, a first control command of a controller instructing a first device, other than the electronic device and the second device, to execute a corresponding event, wherein the first device and the second device are household devices configured when connected to a power supply to receive the control command directly from the controller, and wherein the second device is connected to the power supply;
determine, in response to the first control command, that the first device is not connected to the power supply either:
when a network connection status of the first device is an unconnected mode, wherein the network connection status is obtained from stored network connection statuses of respective devices; or
when receiving, from an input apparatus, power supply status information that indicates that the first device is not connected to the power supply; and
receive, by the electronic device from the server, a power supply connect instruction instructing the input apparatus to connect the first device to the power supply;
send, to the input apparatus of the first device connected to the first device via a circuit and to the power supply in response to the determination, the power supply connect instruction instructing the input apparatus to connect the first device to the power supply, wherein the input apparatus comprises a power button or a power switch for connecting the first device to the power supply, and wherein the input apparatus connects the first device to the power supply based on the power supply connect instruction instead of the power button or power switch.

8. The electronic device of claim 7, wherein the programming instructions further cause the processor to be configured to:
listen to a first WI-FI frame; and
receive the first WI-FI frame that carries the first control command from the controller.

9. The electronic device of claim 8, wherein the electronic device is a wireless router, and wherein the programming instructions further cause the processor to be configured to send the first WI-FI frame to the first device to instruct the first device to execute an event indicated by the first WI-FI frame after connecting the first device to the power supply.

10. The electronic device of claim 7, wherein the first control command comprises any one of an infrared signal, a BLUETOOTH signal, or a WI-FI frame.

11. A non-transitory computer program product comprising computer-executable instructions stored on a non-transitory computer-readable medium that, when executed by a processor, cause an electronic device to:
receive, by a server from a second device through electronic device, a first control command of a controller instructing a first device other than the electronic device to execute a corresponding event, wherein the first device and the second device are household devices configured when connected to a power supply to receive the control command directly from the controller, and wherein the second device is connected to the power supply; and
determine, by the electronic device in response to the first control command, that the first device is not connected to the power supply either:
when a network connection status of the first device is an unconnected mode, wherein the network connection status is obtained from stored network connection statuses of respective devices; or
when receiving, from an input apparatus, power supply status information that indicates that the first device is not connected to the power supply; and receive, by the electronic device from the server, a power supply connect instruction instructing the input apparatus to connect the first device to the power supply;

send, to the input apparatus of the first device connected to the first device via a circuit and to the power supply in response to the determination, the power supply connect instruction instructing the input apparatus to connect the first device to the power supply, wherein the input apparatus comprises a power button or a power switch for connecting the first device to the power supply, and wherein the input apparatus connects the first device to the power supply based on the power supply connect instruction instead of the power button or power switch.

12. The non-transitory computer program product of claim 11, wherein the computer-executable instructions further cause the electronic device to:

listen to a first WI-FI frame; and receive the first WI-FI frame that carries the first control command from the controller.

13. The non-transitory computer program product of claim 12, wherein the computer-executable instructions further cause the electronic device to send the first WI-FI frame to the first device to execute an event indicated by the first WI-FI frame after connecting the first device to the power supply, and wherein the electronic device is a wireless router.

14. The non-transitory computer program product of claim 11, wherein the first control command comprises any one of an infrared signal, a BLUETOOTH signal, or a WI-FI frame.

\* \* \* \* \*